(12) United States Patent
Bert

(10) Patent No.: US 12,131,041 B2
(45) Date of Patent: Oct. 29, 2024

(54) DYNAMIC ZONE GROUP CONFIGURATION AT A MEMORY SUB-SYSTEM

(71) Applicant: MICRON TECHNOLOGY, INC., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 50 days.

(21) Appl. No.: 17/680,183

(22) Filed: Feb. 24, 2022

(65) Prior Publication Data

US 2023/0266897 A1 Aug. 24, 2023

(51) Int. Cl.
*G06F 3/06* (2006.01)

(52) U.S. Cl.
CPC .......... *G06F 3/0632* (2013.01); *G06F 3/0604* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| 11,586,385 B1 * | 2/2023 | Lercari | G06F 1/30 |
| 2014/0156915 A1 * | 6/2014 | Borchers | G06F 3/0644 |
| | | | 711/103 |
| 2014/0164694 A1 | 6/2014 | Storer | |
| 2015/0363126 A1 * | 12/2015 | Frick | G06F 3/0634 |
| | | | 711/114 |
| 2019/0004739 A1 * | 1/2019 | Tang | G06F 3/0608 |
| 2020/0167274 A1 * | 5/2020 | Bahirat | G06F 3/0644 |
| 2022/0107734 A1 * | 4/2022 | Kim | G06F 3/0656 |
| 2022/0156000 A1 * | 5/2022 | Inbar | G06F 3/0658 |
| 2022/0229596 A1 * | 7/2022 | Jung | G06F 3/061 |
| 2022/0326847 A1 * | 10/2022 | Otto | G06F 3/0676 |
| 2022/0350530 A1 * | 11/2022 | Yoshida | G06F 3/0644 |
| 2022/0398201 A1 * | 12/2022 | Goto | G06F 3/061 |
| 2023/0342028 A1 | 10/2023 | Lee et al. | |

OTHER PUBLICATIONS

Non-Final Office Action for U.S. Appl. No. 17/680,185, mailed Aug. 3, 2023, 27 Pages.

\* cited by examiner

*Primary Examiner* — Stephanie Wu
(74) *Attorney, Agent, or Firm* — Lowenstein Sandler LLP

(57) ABSTRACT

A system includes one or more memory devices and a processing device coupled to the memory device(s) to perform operations including receiving a first set of data items from a host system to be programmed to the one or more memory devices. The operations include determining, in view of a first zone group identifier associated with the first set of data items, that each data item of the first set of data items is to be programed to one or more zones associated with a first zone group identified by the first zone group identifier. The operations include identifying a first set of zones across the one or more memory devices that match a size associated with the first zone group and that satisfy a programming parallelism criterion. The operations include programming each of the first set of data items to memory cells residing at the identified first set of zones.

18 Claims, 16 Drawing Sheets

DYNAMIC ZONE GROUP CONFIGURATION AT A MEMORY SUB-SYSTEM

RELATED APPLICATIONS

The present application is related to U.S. patent application Ser. No. 17/680,185, filed Feb. 24, 2022, titled "Host-Defined Zone Group Configuration at a Memory Sub-System."

TECHNICAL FIELD

Embodiments of the disclosure relate generally to memory sub-systems, and more specifically, relate to dynamic zone group configuration at a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
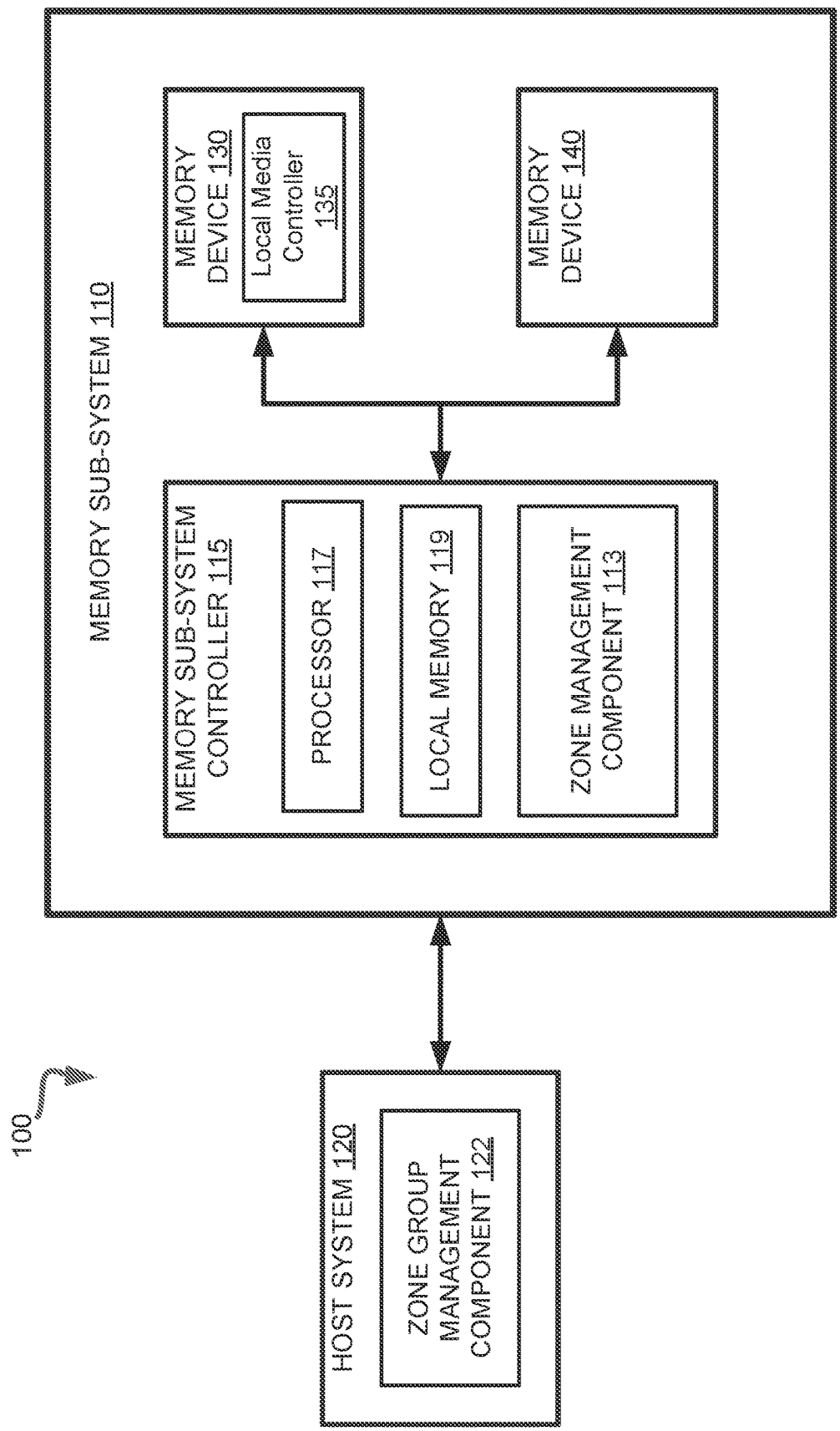
FIG. 1 illustrates an example computing system that includes a memory sub-system, in accordance with some embodiments of the present disclosure.

Aspects of the present disclosure are directed to dynamic zone group configuration at a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page corresponds to a set of memory cells. A memory cell is an electronic circuit that stores information. In some instances, memory cells can be single level cells (SLCs) that are configured to store a single bit of data (e.g., a single data item, etc.). In other instances, memory cells can be configured to store multiple bits of data. For example, memory cells can be multi-level cells (MLCs), triple-level cells (TLCs), or quad-level cells (QLCs) (collectively referred to herein as XLCs or multiple level cells). Each memory cell type can have a different data density, which corresponds to an amount of data (e.g., bits of data, etc.) that can be stored per memory cell).

Data operations can be performed by the memory sub-system. The data operations can be host-initiated operations. For example, the host system can initiate a data operation (e.g., write, read, erase, etc.) on a memory sub-system. The host system can send access requests (e.g., a programming command, a read command, etc.) to the memory sub-system, such as to store data on a memory device at the memory sub-system and to read data from the memory device on the memory sub-system. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data. A data item, as used herein, refers to a unit of data (e.g., one or more bits of host data) that is associated with a respective logical address (e.g., as provided by the host system).

Memory devices can be configured with a zoned namespace. In a zoned namespace, the address space (e.g., LBA space) of the memory device (or memory sub-system) is divided into zones. The zones are laid out sequentially in the zoned namespace, and each zone can include one or more erase units (e.g., a block, etc.) of the memory sub-system. A memory sub-system controller can program data (e.g., host data) within each zone. A zone including programmed data can be reset and new data can be programmed to the reset zone. A host system can manage the operation of zones within a zoned namespace. For example, each zone can be associated with a particular type of input/output (I/O) workload (e.g., read-intensive IO workloads, write-intensive IO workloads, mixed read and write IO workloads, etc.). In another example, each zone can be associated with a particular file, type of file, and/or according to different criteria, in some instances. The host system can transmit instructions to the memory sub-system controller to cause host data to be programmed to a specified zone based on particular criteria associated with the data (e.g., IO workload type, file type, etc.). The memory sub-system can program the host data across each respective zone, according to the instructions received from the host system. By enabling the host system to manage the placement of host data (i.e., at a designated zone), the host system can sequentially program host data within one or more erase units of the memory sub-system, as the host can cause data associated with different types (e.g., IO workload types, file types, etc.) to be programmed to respective erase units. For example, the host can cause data associated with write-intensive IO workloads to be programmed to different erase units than data associated with read-intensive IO workloads. Accordingly, a fewer number of memory maintenance operations (e.g., garbage collection operations, etc.) are performed to manage the placement of data at the memory sub-system, which can increase overall throughput, decrease overall latency, and/or increase overall lifetime of the memory sub-system.

Although the host system can manage zones within a zoned namespace, each zone is configured by the memory sub-system controller. For example, a memory sub-system can designate zones according to one or more zone sizes that are pre-defined, for instance, by a developer or operator of the memory sub-system. In one example, the pre-defined zone sizes can include a small zone, a large zone, a mid-size zone, and/or other zone sizes. The host system can open and/or manage one or more zones associated with particular IO workload types, as provided in the previous example. However, the size of each zone opened by the host system is limited to the zone size options supported by the memory sub-system. In some instances, the pre-defined zone sizes supported by the memory sub-system do not align with the target zone configuration of the host system. For example, the host system can support a file storage database and can be configured to access files stored at the memory sub-system. The size of each file (or set of files) may not be compatible with any available zone sizes supported by the memory sub-system. In one example, each file can be larger than a zone having a small zone profile but smaller than a zone having a mid-size or large zone profile. Accordingly, data for files of the file storage database can be programmed across multiple zones, in some instances, and can be programmed across multiple erase units of the memory sub-system. If data for a respective file is programmed across multiple erase units the host system cannot take full advantage of the performance benefit associated with the zoned namespace (e.g., increased throughput, decreased latency, increased overall system lifetime).

Further, memory sub-system controllers can be configured to only support zones associated with a single pre-defined zone size. For instance, memory sub-system controller can configure memory devices to support large zones, but small and/or mid-size zones may not also be supported. In one illustrative example, a host system can support one or more applications and can generate (or otherwise obtain) metadata and/or data associated with each application. The size of the metadata associated with each application can correspond to a small zone and/or the size of data for each application (e.g., application instruction data, content data, etc.) can correspond to the size of a mid-size or large zone. The host system can determine that an optimal zone configuration for the application data and metadata is to program metadata to one or more zones having a small zone profile and to program application data to one or more zones having mid-size or large zone profiles. However, as some memory sub-systems do not enable the host system to manage zones having different size profiles, such memory sub-systems do not provide the host system with the ability to manage both small zones and mid-size or large zones, and therefore the host cannot take full advantage of the performance benefit associated with the zoned namespace, as described above.

Aspects of the present disclosure address the above and other deficiencies by providing mechanisms to enable the host system to configure zone groups, such that each zone group would include one or more zones of a zoned namespace at a memory sub-system. A zone group refers to a collection of zones that is treated by the host system as a single zone. A memory sub-system controller can configure zones at one or more memory devices of a memory sub-system to each have the same or a similar size. In some embodiments, the size of each zone can be the smallest possible zone size (e.g., in accordance with a zoned namespace (ZNS) standard protocol). For example, the size of each zone can correspond to a size of a memory device (e.g., a die) or a portion of a memory device (e.g., one or more planes, one or more blocks, etc.). The memory sub-system controller can transmit an indication of the zone size to a host system (e.g., during initialization of the memory sub-system), in some embodiments.

The host system can define one or more zones groups based on the zones configured at the memory sub-system. In an illustrative example, a fixed zone size at the memory sub-system can be approximately 4 kilobytes (KB). The host system can define a zone group to include 16 KB of host data. The memory sub-system controller can program the 16 KB of host data of the zone group to four zones of the memory sub-system (e.g., 4 KB of data per zone), in accordance with examples and embodiments described herein. The host system can access the host data, or a portion of the host data, of the zone group by issuing one or more instructions that reference the zone group, in accordance with embodiments described herein.

In some embodiments, the host system can dynamically configure zone groups that include a different number of zones and therefore having different sizes. For example, the host system can indicate to the memory sub-system controller the size of a zone group and/or an identifier associated with the zone group (e.g., by updating programming commands associated with host data, by transmitting a notification including the indication of the zone group size and/or the zone group identifier, etc.). The memory sub-system controller can identify a set of zones across one or more memory devices of the memory sub-system that match the zone group size and satisfy a programming parallelism criterion. The programming parallelism criterion can correspond to whether data associated with a respective zone group can be programmed across the one or more memory devices in parallel (e.g., using a single programming operation) and/or using a minimal number of programming operations. Responsive to identifying a set of zones that matches the zone group size and satisfies the programming parallelism criterion, the memory sub-system controller can open the set of zones to store data and can program data associated with the zone group to the opened set of zones. Further details regarding the host system configuring zone groups and the memory sub-system controller identifying and opening zones are provided herein.

In other or similar embodiments, the host system can define zone groups without communicating zone group identifiers to the memory sub-system controller. For example, the host system can determine a fixed zone group size for all zone groups that are to be managed by the host system. The host system can associate a set of data items with an initial zone group and can transmit instructions to the memory sub-system controller to program the data items of the initial zone group to the memory sub-system. The memory sub-system controller can identify a set of zones across one or more memory devices that satisfy a parallelism criterion in view of the size of the initial zone group and, optionally, can program the set of host data item to memory cells of the identified set of zones. The memory sub-system controller can associate the size of the initial zone group as a fixed zone group size for all zone groups to be managed by the host system. When incoming host data is received by the memory sub-system controller, the memory sub-system controller can determine whether any zones associated with a recently created zone group are opened and available to store the incoming host data. If so, the memory sub-system controller can program the host data to the available zone. If not, the memory sub-system controller can identify a set of zones across the memory sub-system that satisfy the parallelism criterion in view of the fixed zone group size and can open the identified set of zones for storage of the host data, as described above.

Advantages of the present disclosure include, but are not limited to, enabling a host system to create custom zone groups based on operating characteristics and/or performance targets of the host system. Embodiments of the present disclosure give the host system the flexibility to define each zone group to have a size that is sufficient to include host data associated with a respective criteria of the host system and, in some instances, control ordering of the host data across zones of the zone group (e.g., in accordance with a zone striping scheme described in further detail herein). The host system can treat each zone group as a single zone, for example, by executing a single reset command to reset data programed to each zone of the zone group. Accordingly, host data of a respective zone group is included in the same erase unit (from the perspective of the host system), and a fewer number of memory maintenance operations are performed to manage the placement of host data at the memory sub-system, which can increase overall throughput, decrease overall latency, and/or increase overall lifetime of the memory sub-system.

In addition, the memory sub-system controller is enabled to program host data associated with a particular zone group to zones that satisfy a parallelism criterion (e.g., zones having capacity to store the host data and can be programmed in parallel and/or with a minimal number of programing operations). As the memory sub-system controller is enabled to program host data of each zone group using a minimal number of programming operations, a number of programming operations performed at the memory sub-system is significantly reduced and system resources (e.g., computing resources) can be allocated to other processes executing at the memory sub-system. Accordingly, an overall memory sub-system efficiency can be increased and an overall memory sub-system latency can be decreased.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a zone management component 113 (also referred to as zone manager 113 herein) that can configure and/or manage zones across memory devices 130, 140. As described above, a zone refers to a portion of memory device 130, 140 that includes one or more erase units (e.g., a block, etc.). Zones can be configured at memory sub-system 110 in accordance with a zoned namespace (ZNS) standard protocol, in some embodiments. In some embodiments, the memory sub-system controller 115 includes at least a portion of the zone management component 113. For example, the memory sub-system controller 115 can include a processor 117 (processing device) configured to execute instructions stored in local memory 119 for performing the operations described herein. In some embodiments, the zone management component 113 is part of the host system 120, an application, or an operating system.

Zone manager 113 can configure one or more zones across memory devices 130, 140 (e.g., during an initialization of memory sub-system 110). In some embodiments, zone manager 113 can configure each zone to have the same or a similar size. The size of each zone can be the smallest size that is permitted by the ZNS standard protocol, in some embodiments. Zone manager 113 can configure each zone by identifying a region of a memory device 130, 140 including memory cells that correspond to one or more erase units (e.g., blocks, etc.) and designating the identified region as a zone. For example, if the smallest zone size permitted by the ZNS standard protocol is approximately 4 kilobytes (KB), zone manager 113 can identify regions of memory cells that have a data storage capacity of 4 KB and designate each identified region as a zone. In another example, if the smallest zone size permitted by the ZNS standard protocol is approximately 4 gigabytes (GB), zone manager 113 can identify regions of memory cells that have a data storage capacity of 4 GB and designate each identified region as a zone. Zone manager 113 can include an indication of each designated zone (e.g., a range of physical addresses included in each respective zone) in a data structure stored at local memory 119, in some embodiments. It should be noted that although some embodiments or examples of the present disclosure are directed to data and/or number of memory cells associated with a size in kilobytes or gigabytes, any size of data and/or number of memory cells can be implicated by the present disclosure. Such numbers are provided for purpose of example only and are not to be interpreted as limiting embodiments or examples.

Zone manager 113 can transmit an indication of the size of each zone to host system 120, in some embodiments. Host system 120 can include a zone group management component 122 (referred to as zone group manager 122 herein) that can configure and/or manage zone groups at memory sub-system 110. A zone group refers to a collection of zones that is treated by host system 120 as a single zone. Zone group manager 122 can associate data that satisfies a particular criteria with one or more zone groups. For example, zone group manager 122 can define one or more zones groups where each zone group is associated with a particular type of IO workload (e.g., read-intensive IO workloads, write-intensive IO workloads, mixed read and write IO workloads, etc.), a particular file or type of file, and/or different criteria. In some embodiments, zone group manager 122 can configure each zone group in view of the size of each zone of memory sub-system 110. In an illustrative example, zone group manager 122 can determine that each zone of memory sub-system 110 is approximately 4 KB. Zone group manager 122 can determine that a respective file (or set of files) supported by a file storage application running on host system 120 is approximately 16 KB and, accordingly, can determine that zones of a respective zone group is to store 16 KB of data, where 4 KB segments (or chunks) of the file (or set of files) are to be programmed to a respective 4 KB zone of the memory sub-system 110. Zone group manager 122 can transmit the data associated with the zone group (e.g., the data of the 16 KB file) to memory sub-system 110 and zone manager 113 can identify a set of zones that has sufficient storage capacity to store the data and satisfies a programming parallelism criterion (i.e., the data can be programmed to the set of zones in parallel and/or by executing a minimal number of programming operations). Zone manager 113 can associate the identified set of zones with the zone group and can program the data associated with the zone group to memory cells associated with the set of zones.

Zone group manager 113 can create another zone group and transmit data associated with that zone group for programming at memory devices 130, 140, as described above. In some embodiments, zone group manager 122 can configure another zone group having a different amount of data (e.g., the zone group is a different size than the previous zone group). In other or similar embodiments, the size of the initially created zone group can be the size for all zone groups configured by zone group manager 122. Further details regarding the creation of zone groups and programming data items to zones of memory sub-system 110 are provided herein.

Figure 2:
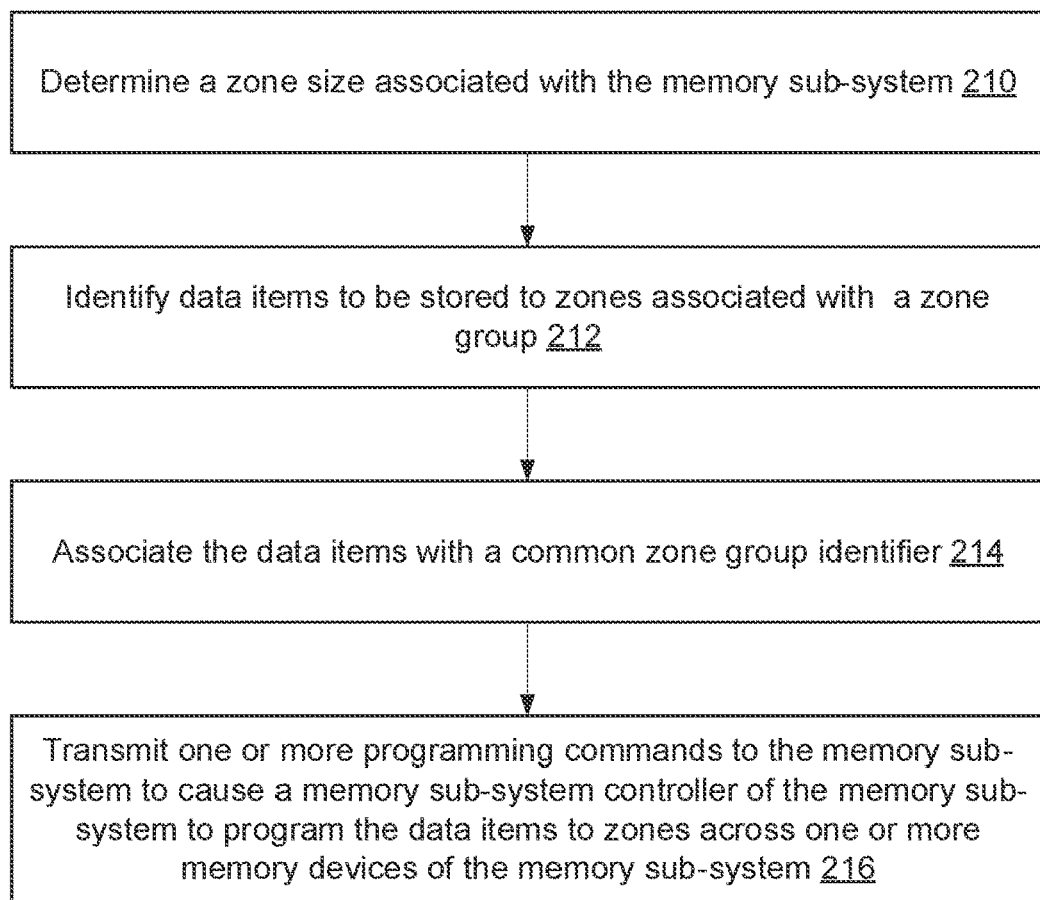
FIG. 2 is a flow diagram of an example method for dynamic zone group configuration at a memory sub-system, in accordance with some embodiments of the present disclosure.

FIG. 2 is a flow diagram of an example method 200 for dynamic zone group configuration at a memory sub-system, in accordance with embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 200 are performed by host system 120 of FIG. 1. For example, one or more operations of method 200 can be performed by zone group manager 122. One or more operations of method 200 is performed by a component of the memory sub-system controller 115 (e.g., zone manager 113), or by a component of local media controller 135, in additional or alternative embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, processing logic can determine a zone size associated with the memory sub-system. As described with respect to FIG. 1, zone manager 113 can configure one or more zones across memory devices 130, 140 of memory sub-system 110. Zone manager 113 can configure each zone to have the same or a similar size, in some embodiments. In some embodiments, zone manager 113 can configure each zone to have the smallest size permitted by a ZNS standard protocol, as described above. In some embodiments, zone manager 113 can configure each zone based on zone configuration metadata (e.g., stored at local memory 119, provided by a developer or user associated with memory sub-system 110, etc.). Responsive to configuring the one or more zones across memory devices 130, 140, zone manager 113 can transmit an indication of the zone size to zone group manager 122 of host system 120. Zone group manager 122 can determine the zone size associated with each zone of the memory sub-system in view of the notification. In additional or alternative embodiments, zone manager 113 can store an indication of the zone size at a portion of local memory 119. Zone group manager 122 can access the portion of local memory 119 that stores the indication of the zone size.

Figure 4A:
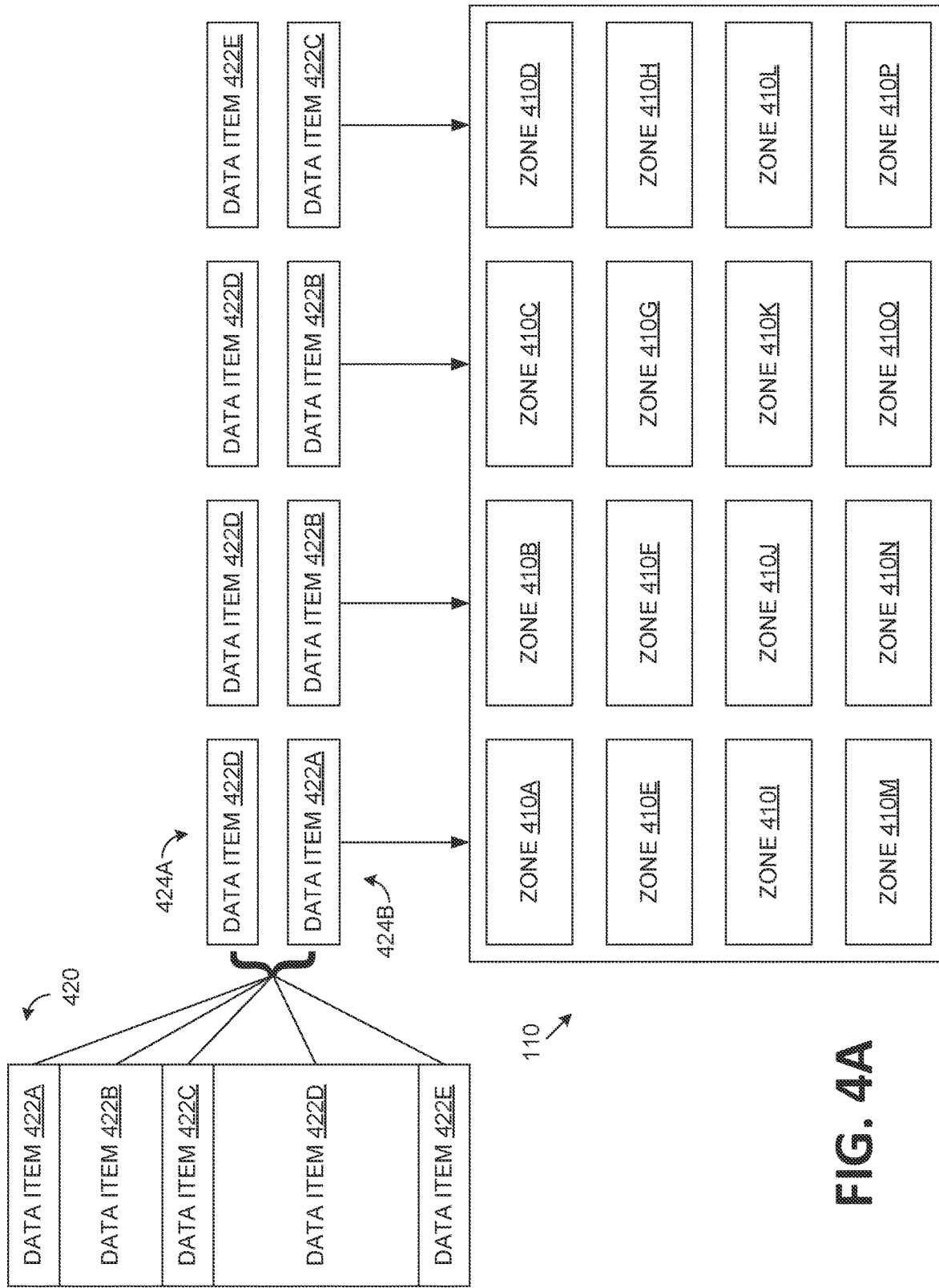
FIGS. 4A-4D depict an example of dynamic zone group configuration at a memory sub-system, in accordance with some embodiments of the present disclosure.

FIG. 4A illustrates example zones 410 across memory devices 130, 140 of memory sub-system 110, in accordance with some embodiments of the present disclosure. As illustrated in FIG. 4A, memory sub-system 110 can include one or more zones 410 (e.g., zones 410A-410P) across memory devices 130, 140 (not shown in FIG. 4A). It should be noted that, in some embodiments, each zone 410 can correspond to a respective memory device 130, 140 of memory sub-system 110. In other or similar embodiments, each zone 410 can correspond to a portion (e.g., one or more planes, blocks, etc.) of a respective memory device 130, 140. Zone manager 113 can configure each zone 410 to be the same size, as described above. Additionally or alternatively, zone manager 113 can configure each zone 410 to include one or more erasable units (e.g., blocks, etc.). An erasable unit does not span two or more zones 410, in some embodiments.

Referring back to FIG. 2, at block 212, processing logic can identify data items to be stored to zones associated with a zone group. As illustrated in FIG. 4A, host system 120 can maintain a queue 420 of data items 422 that are to be programmed to memory sub-system 110. In some embodiments, the queue 420 can include data items 422 associated with one or more threads (i.e., threads of execution) executing on host system 120. For example, queue 420 can include a first data item 422A associated with a first thread running on host system 120, a second data item 422B associated with a second thread running on host system 120, and so forth. The size of each data item 422 can be different, in some embodiments. In an illustrative example, first data item 422A, third data item 422C, and fifth data item 422E can each be approximately 4 KB, second data item 422B can be approximately 8 KB, and/or fourth data item 422D can be approximately 12 KB.

Zone group manager 122 can determine that data items 422A-422E are to be stored to zones associated with in the same zone group in view of one or more zone group criteria, in some embodiments. For example, zone group manager 122 can determine that each of data items 422A-422E are associated with a particular type of IO workload (e.g., a read-intensive IO workload, a write-intensive IO workload, a mixed read and write IO workload, etc.), the same file, the same type of file, etc., and can therefore determine that each of data items 422A-422E are to be included in the same zone group. Responsive to determining that data items 422A-422E are to be included in the same zone group, zone group manager 122 can create one or more zone stripes 424 associated with the zone group. A zone stripe corresponds to an ordering of a set of data items to be programmed to zones 410 associated with a respective zone stripe 424. Zone group manager 122 can determine ordering at which the data items are to be programmed to zones 410 and associate each data item to a respective portion of zone stripe 424. Each portion of the zone stripe 424 can be the same size as a zone 410 configured by zone manager 113. In accordance with previous examples, each portion of zone stripe(s) 424 can be approximately 4 KB.

Zone group manager 122 can associate each data item 422 with one or more respective portions of zone stripe 424. In some embodiments, a size of a data item 422 is larger than a size of a respective portion of zone stripe 424. Accordingly, zone group manager 122 can partition the data item 422 and associate each portion of the partitioned data item 422 with a respective portion of zone stripe 424. As illustrated in FIG. 4A, zone group manager 122 can create zone stripe 424A and zone stripe 424B and can associate each portion of zone stripes 424A and 424B with a data item 422 or a partitioned data item 422. For example, as data item 422A is approximately 4 KB, zone group manager 122 can associate data item 422A with a portion of zone stripe 424A (or 424B). As data item 422B is approximately 8 KB, zone group manager 122 can partition data item 422B into two-4 KB segments and associate a first portion of zone stripe 424A (or 424B) with a first segment of data item 422B and a second portion of zone stripe 424A (or 424B) with a second segment of data item 422B. Zone group manager 122 can associate data items 422C-422E (or portions of data items 422C-422E) with other portions of zone stripes 424A and/or 424B, as described above. It should be noted that although FIG. 4A illustrates data items 422A-422E added to zone stripes 424A and 424B according to the same ordering that data items 422A-422E are included in queue 420, zone group manager 122 can add data items 422A-422E (or portions of 422A-422E) to zone stripes 424A and 424B in any ordering. In some embodiments, zone group manager 122 can generate parity data associated with other data items included in the zone stripe(s) 424 or a respective zone group. Further details regarding parity data are provided with respect to FIGS. 4C-4D.

Referring back to FIG. 2, at block 214, processing logic can associate the data items with a common zone group identifier. The common zone group identifier can indicate to zone manager 113 (or another component of memory sub-system controller 115) that each of the data items are associated with the same zone group, as defined by zone group manager 122. In some embodiments, zone group manager 122 can associate the data items with the common zone group identifier by updating one or more programming commands to include an indication of the common zone group identifier. In an illustrative example, the zone group associated with data items 422A-422E can be zone group "A." Zone group manager 122 can update programming commands associated with data items 422A-422E to include an indication of the identifier for zone group "A." In some embodiments, zone group manager 122 can update the programming commands by identifying one or more available bits of the programming command and updating a value of the one or more available bits to correspond to the common zone group identifier. For example, zone group manager 122 can identify one or more bits of the programming command that were previously used for different identifiers (e.g., a stream identifier, etc.) in the programming command, but are no longer used for such identification. Zone group manager 122 can use the identified one or more bits of each programming command associated with data items 422A-422E to indicate the identifier for zone group "A." In some embodiments, the identified one or more bits can include bits that correspond to a LBA associated with data items 422A-422E.

At block 216, processing logic can transmit one or more programming commands to the memory sub-system (e.g., memory sub-system 110) to cause a memory sub-system controller of the memory sub-system (e.g., memory sub-system controller 115) to program the host data items to zones across one or more memory devices (e.g., memory devices 130, 140) of the memory sub-system. In some embodiments, processing logic (e.g., zone group manager 122) can transmit each of the programming commands associated with each data item 422A-422E to memory sub-system 110 at or around the same time. In other or similar embodiments, zone group manager 122 can transmit the programming commands associated with each data item 422A-422E as a series of commands. For example, zone group manager 122 can transmit a first set of programming commands associated with a portion of data items 422A-422E to memory sub-system 110 at a first time period and a second set of programming commands associated with another portion of data items 422A-422E to memory sub-system 110 at a second time period. Zone manager 113 (or another component of memory sub-system controller 115) can program data items 422A-422E to memory cells of zones across memory devices 130, 140, in accordance with embodiments described with respect to FIG. 3.

Figure 3:
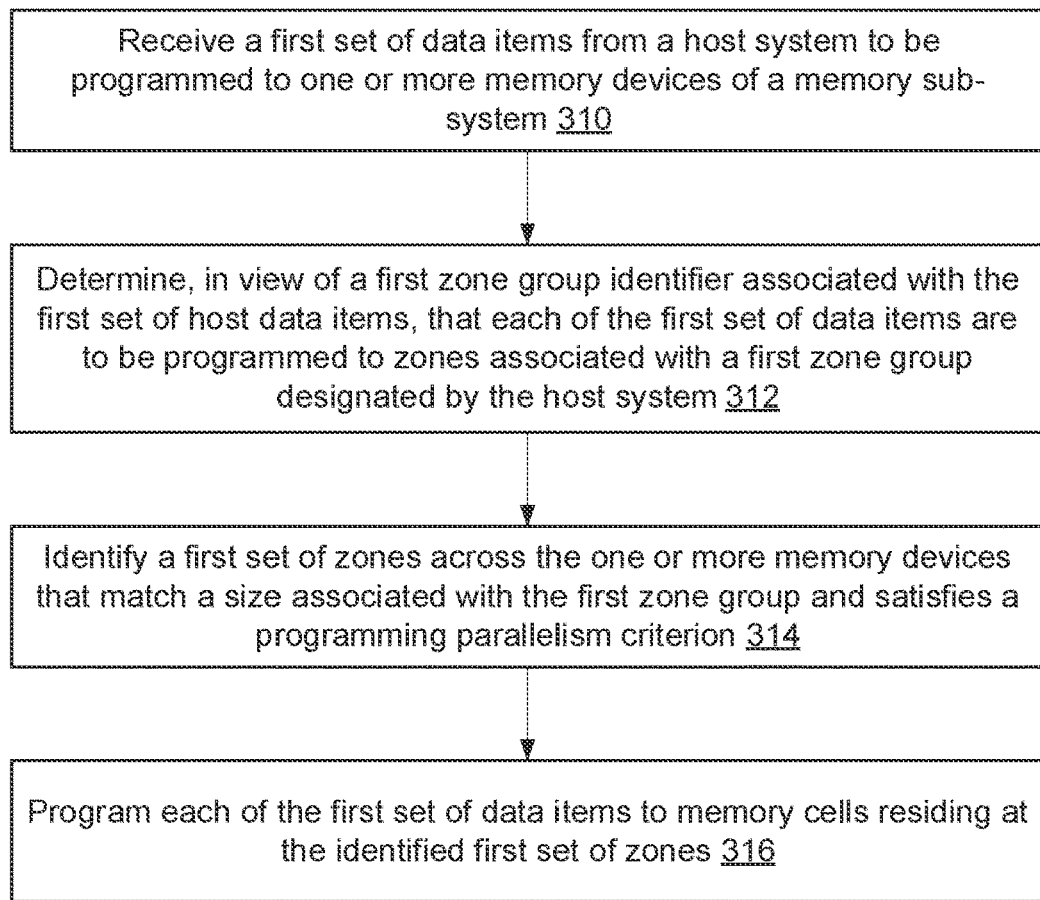
FIG. 3 is a flow diagram of another example method for dynamic zone group configuration at a memory sub-system, in accordance with some embodiments of the present disclosure.

FIG. 3 is a flow diagram of another example method 300 for dynamic zone group configuration at a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 300 are performed by a component of memory sub-system controller 115 of FIG. 1. For example, one or more operations of method 300 can be performed by zone manager 113. One or more operations of method 300 is performed by another component of the memory sub-system controller 115, or by a component of local media controller 135, in additional or alternative embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 310, processing logic can receive a first set of data items from a host system to be programmed to one or more memory devices of a memory sub-system. Processing logic can correspond to zone manager 113, as described above. As described with respect to FIG. 2 and FIG. 4A, zone group manager 122 of host system 120 can transmit data items associated with a particular zone group to memory sub-system 110. The transmitted data items can correspond to the first set of data items receive by zone manager 113. For example, the first set of host data items can include one or more of data items 422A-422E, as described with respect to FIG. 4A.

At block 320, processing logic can determine, in view of a first zone group identifier associated with the first set of data items, that each of the first set of data items are included in a first zone group designated by the host system (e.g., host system 120). Zone manager 113 can extract the first zone group identifier from one or more programming commands associated with the first set of data items. As described above, zone group manager 122 can update programming commands associated with data items 422A-422E to include an indication of a common zone group identifier (e.g., for "zone group A"). For example, zone group manager 122 can update one or more bits of the programming commands to indicate that data items 422A-422E correspond to zone group A. The one or more updated bits can be included in respective LBAs associated with data items 422A-422E. In response to receiving the programming commands from host system 120, zone manager 113 can parse through the received commands and can extract the zone group identifier from each of the parsed commands. In response to determining that the zone group identifier indicated by each programming command corresponds to a common zone group (e.g., zone group A), zone manager 113 can determine that each of the first set of data items are included in the first zone group (e.g., zone group A).

At block 330, processing logic can identify a first set of zones across the one or more memory devices that matches a size associated with the first zone group satisfies a programming parallelism criterion in view of a size associated with the first zone group. A set of zones can match a size associated with a zone group if the size of the set of zones corresponds to the size associated with the zone group. The set of zones can satisfy a programming parallelism criterion if zone manager 113 (or another component of memory sub-system controller 115) can program data associated with the zone group to the set of zones in parallel (e.g., using a single programming operation) and/or using a minimal number of programming operations. Such set of zones can satisfy the programming parallelism criterion in view of the size associated with the zone group, as provided herein. In some embodiments, zone manager 113 can determine whether the set of zones satisfies the programming parallelism criterion in view of an architecture associated with memory sub-system 110. For example, memory sub-system 110 can include two or more memory devices 130, 140 that are each connected to memory sub-system controller 115 via a respective data channel. Due to the architecture of memory sub-system 110 (e.g., each memory device 130, 140 connected to a single data channel), memory sub-system controller 115 can execute multiple programming operations to program data to portions of each memory device 130, 140 in parallel (e.g., to memory pages associated with a common stripe across memory devices 130, 140), but may not execute multiple programming operations to program data to program data to portions of the same memory device 130, 140 in parallel (e.g., to memory pages associated with different stripes across a single memory device 130, 140). Zone manager 113 can determine the architecture associated with memory sub-system 110 based on data (e.g., memory sub-system 110 configuration data) stored at local memory 119 and/or one or more of memory devices 130, 140. In view of the architecture of memory sub-system 110, zone manager 113 can identify zones 410 across memory devices 130, 140 that can store the data associated with the zone group and can be programmed in parallel (e.g., using a single programming operation applied to each memory device 130, 140).

In accordance with one or more examples provided with respect to FIGS. 2 and 4A, the size of zone group A can be approximately 32 KB (e.g., 4 KB for each of data items 422A, 422C, and 422E, 8 KB for data item 422B, and 12 KB for data item 422D). Accordingly, zone manager 113 can identify a set of zones that can hold 32 KB of data. In accordance with the previous example, each zone can be approximately 4 KB in size. Accordingly, zone manager 113 can identify eight-4 KB zones. Each of zones 410A-410D can reside on separate memory devices 130, 140 (e.g., that are connected to respective data channels). In view of the architecture associated with memory devices 130, 140, zone manager 133 can determine that 16 KB worth of the data items associated with the first zone group can be programmed to zones 410A-410D in parallel and therefore satisfy the parallelism criterion. Each of zones 410E-410H can also reside on separate memory devices 130, 140 (e.g., the same or different memory devices 130, 140 that include zones 410A-410D). In view of the architecture associated with memory devices 130, 140, zone manager 113 can determine that another 16 KB worth of data items associated with the first zone group can be programmed to zones 410E-410H in parallel, and therefore satisfy the parallelism criterion. Accordingly, zone manager 113 can determine that data items 422A-422E can be programmed to zones 410A-410H in parallel and/or using a minimal number of programming operations. Zone manager 113 can therefore identify zones 410A-410H as a set of zones that satisfy the parallelism criterion in view of the size associated with the first zone group.

Figure 4B:
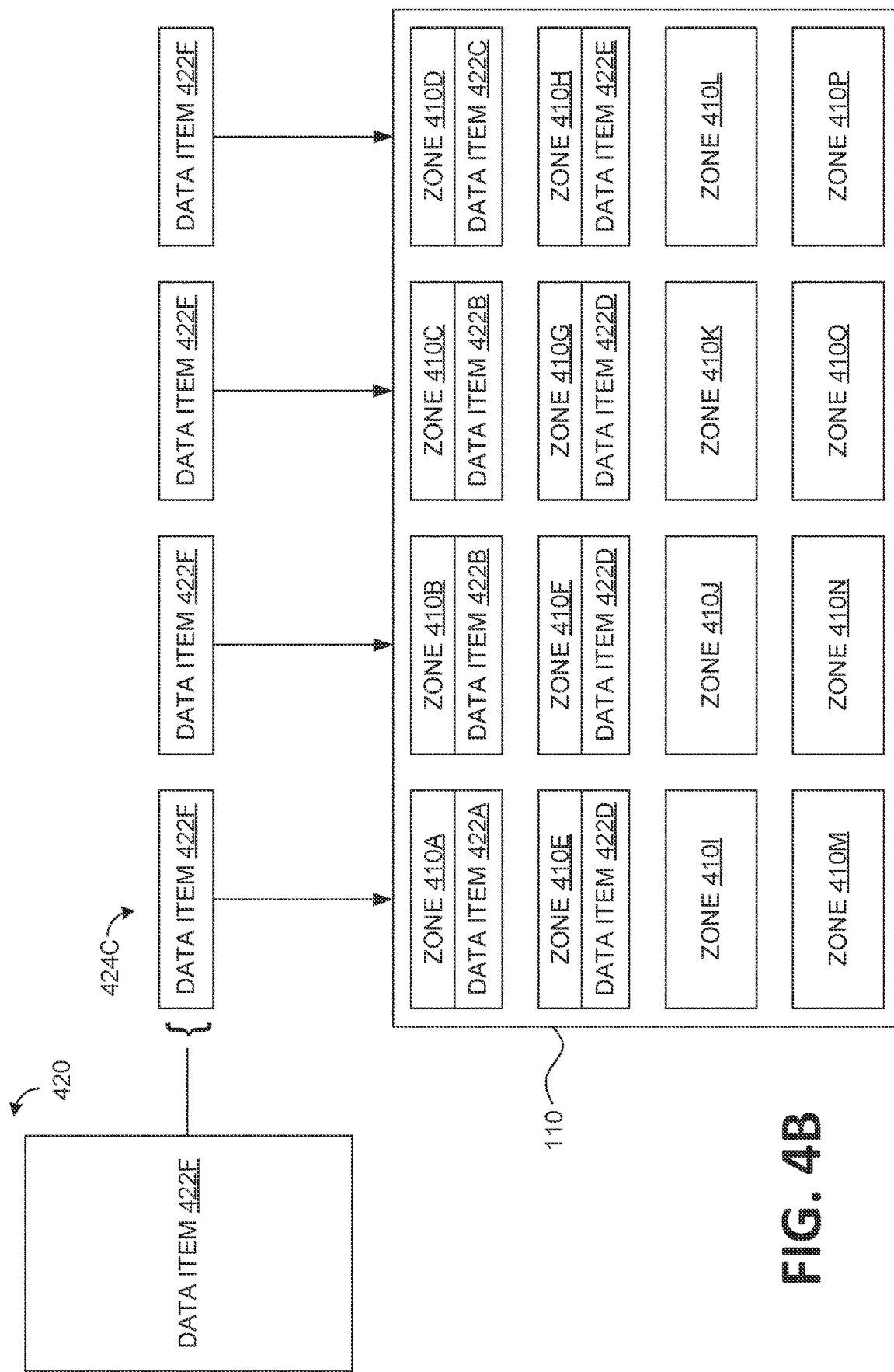

At block 316, processing logic can program each of the first set of data items to memory cells residing at the identified first set of zones. Zone manager 113 (or another component of memory sub-system controller 115) can program each host data item 422 to memory cells of a respective zone 410 of the identified first set of zones. For example, as illustrated in FIG. 4B, zone manager 113 (or another component of memory sub-system controller 115) can program data item 422A to memory cells of zone 410A, data item 422B to memory cells of zones 410B and 410C, data item 422C to memory cells of zone 410D, data item 422D to memory cells of zones 410E-410G, and data item 422E to memory cells of zone 410H. In some embodiments, zone manager 113 or another component of memory sub-system controller 115) can update one or more data structures maintained by memory sub-system controller to indicate the zone group associated with each programmed data item. For example, memory sub-system controller 115 can maintain mapping data (e.g., stored at local memory 119) including a mapping between a physical address associated with memory cells associated allocated to a zone group and a logical address (e.g., a LBA) associated with one or more data items associated with the zone group. Memory sub-system controller 115 can update the mapping data to include a mapping between the physical address associated with memory cells that store a data item and a LBA associated with the data item. As indicated above, the LBA associated with data items 422A-422E can be updated by zone group manager 122 to indicate a zone group associated with such data items. Accordingly, the L2P data structure can include an indication of the zone group associated with data item. In another example, zone manager 113 can maintain a separate data structure that includes mappings between a logical and/or a physical address associated with a data item and an indication of a common zone group identifier associated with the data item. Zone manager 113 can update the data structure to include mappings associated with data items 422A-422E, in some embodiments.

Once data items 422A-422E are programmed to zones 410A-410H, host system 120 can issue commands to access data items 422A-422E residing at zones 410A-410H. For example, host system 120 can issue commands to read one or more of data items 422A-422E programmed to memory cells at zones 410A-410H. In another example, host system 120 can issue commands to reset zones 410A-410H (e.g., to store new data items, etc.). In some embodiments, a command issued by host system 120 can reference the zone group identifier associated with data items 422A-422E rather than a particular zone that stores a data item 422A-422E. Further details regarding commands that can be issued by host system 120 are provided with respect to FIG. 4C.

Zone group manager 122 can create additional zone groups associated with different sizes, in some embodiments. For example, as illustrated in FIG. 4B, queue 420 can include data item 422F. Zone group manager 122 can determine that data item 422F is to be included in a zone group (e.g., in view of one or more zone group criteria), in accordance with previously described embodiments. Zone group manager 122 can create a zone stripe 424C for the zone group and can partition data item 422F into multiple portions, as described above. For example, each portion of zone stripe 424C can be 4 KB (e.g., as the fixed size of each zone is approximately 4 KB). Data item 422F can be approximately 16 KB, so zone group manager 122 can partition data item 422F into four-4 KB portions. Zone group manager 122 can associate each 4 KB portion of data item 422F with a respective portion of zone stripe 424C, in accordance with previously described embodiments.

Figure 4C:
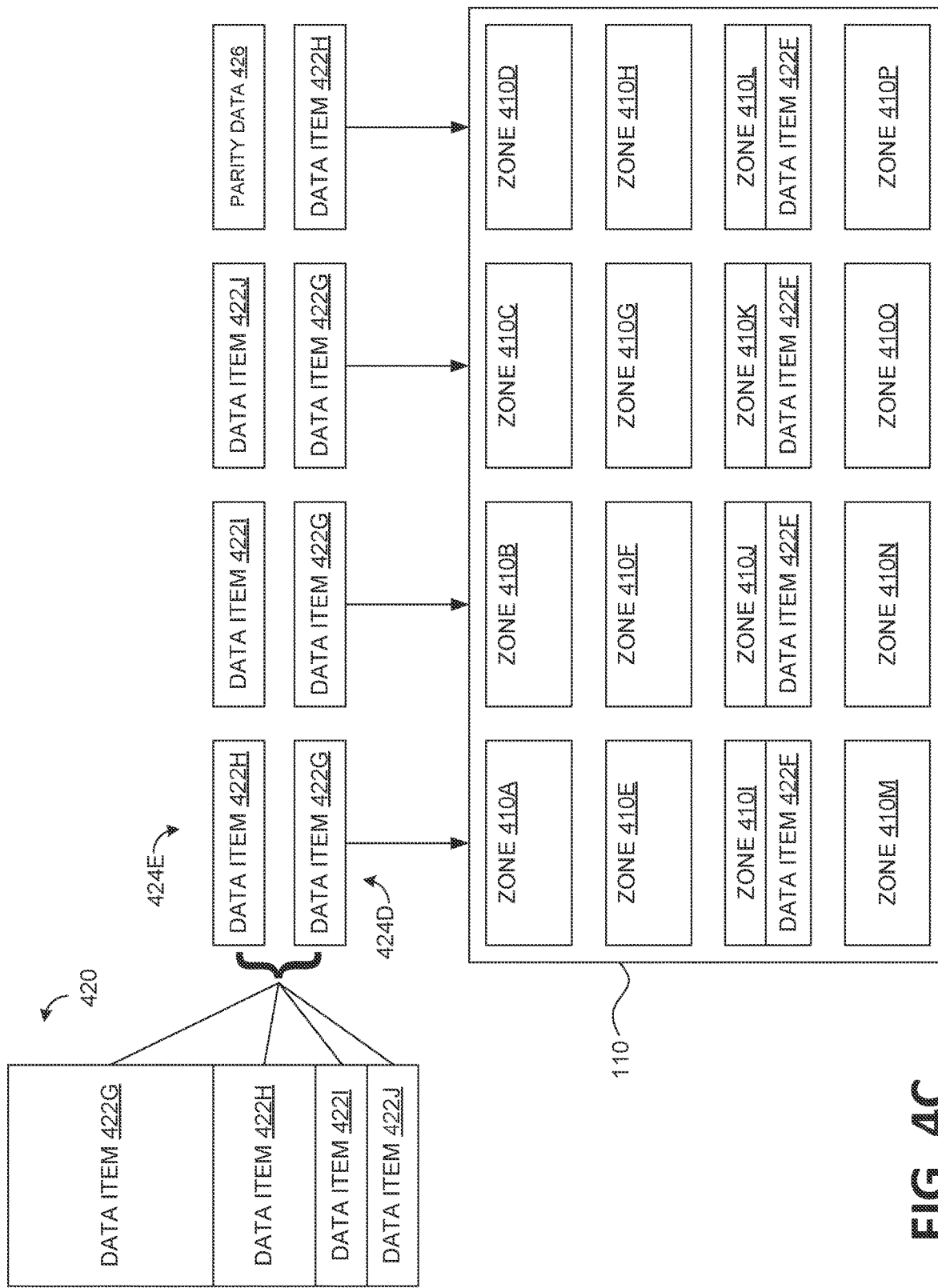

Zone group manager 122 can update one or more programming commands associated with data item 422F to include an identifier of the zone group associated with data item 422F, as described above. In an illustrative example, zone group manager 122 can update one or more bits of each programming command associated with data item 422F to indicate that data item 422F is associated with zone group "B." Zone group manager 122 can transmit the one or more updated programming commands to memory sub-system 110, as described previously. Zone manager 113 can identify a set of zones that satisfy the parallelism criterion in view of the size of zone group "B" (e.g., 16 KB) and can program data item 422F to the identified set of zones, in accordance with previously described embodiments. As illustrated in FIG. 4C, zone manager 113 can identify zones 4101-410L as a set of zones that satisfy the parallelism criterion in view of the size of zone group "B." Zone manager 113 (or another component of memory sub-system controller 115) can program data item 422F to zones 4101-410L. Accordingly, embodiments of the present disclosure enable host system 120 to designate zone groups of different sizes to store data items according to zone criteria and/or a zone ordering that is preferred by the host system 120. Additionally, memory sub-system controller 115 can program the data items associated with a respective zone group to zones across memory sub-system 110 that satisfy a parallelism criterion.

As described above, host system 120 can issue commands to access data items associated with a respective zone group. In some embodiments, host system 120 can issue a read command to one or more of data items 422A-422F via zones 410A-410L. In additional or alternative embodiments, host system 120 can issue a reset command to reset zones storing data associated with a respective zone. For example, zone group manager 122 (or another component of host system 120) can transmit an instruction to memory sub-system 110 to reset zones across memory sub-system 110 that store data associated with zone group "A." In some embodiments, zone group manager 122 can update one or more bits of a reset command to include the identifier associated with zone group "A," as described above. Zone manager 113 can receive the reset command and can identify the zones 410 across memory sub-system 110 that store the data items associated with zone group "A" (e.g., zones 410A-410H). Zone manager 113 (or another component of can execute a reset operation to reset memory cells of zones 410A-410H, in accordance with the instruction. As illustrated in FIG. 4C, host data items 422A-422E are removed from zones 410A-410H responsive to zone manager 113 executing the reset operation.

Zone manager 113 can program incoming data items to reset zones 410A-410H, in accordance with previously described embodiments. For example, as illustrated in FIG. 4C, queue 420 can include data items 422H-422J. Zone group manager 122 can determine that data items 422H-422J are to be associated with a respective zone group (e.g., zone group "C") and can create zone stripes 424D and 424E for zone group "C," as described above. In some embodiments, zone group manager 122 can generate parity data 426 associated with data items 422H-422J. Parity data refers to data that can be used to recover data items 422H-422J (e.g., in the event of a memory access failure at memory sub-system 110). In some embodiments, zone group manager 122 can generate parity data 426 in accordance with a data recovery scheme (e.g., a RAID or RAIN 5 scheme, a RAID or RAIN 6 scheme, etc.). Responsive to generating parity data 426, zone group manager 122 can associate parity data 426 with one or more portions of zone stripes 424D and/or 424E. For example, as illustrated in FIG. 4C, zone group manager 122 can associate parity data 426 with a portion of zone stripe 424E. Zone group manager 122 can select the portion of zone stripes 424D and/or 424E according to any criteria, in some embodiments.

Figure 4D:
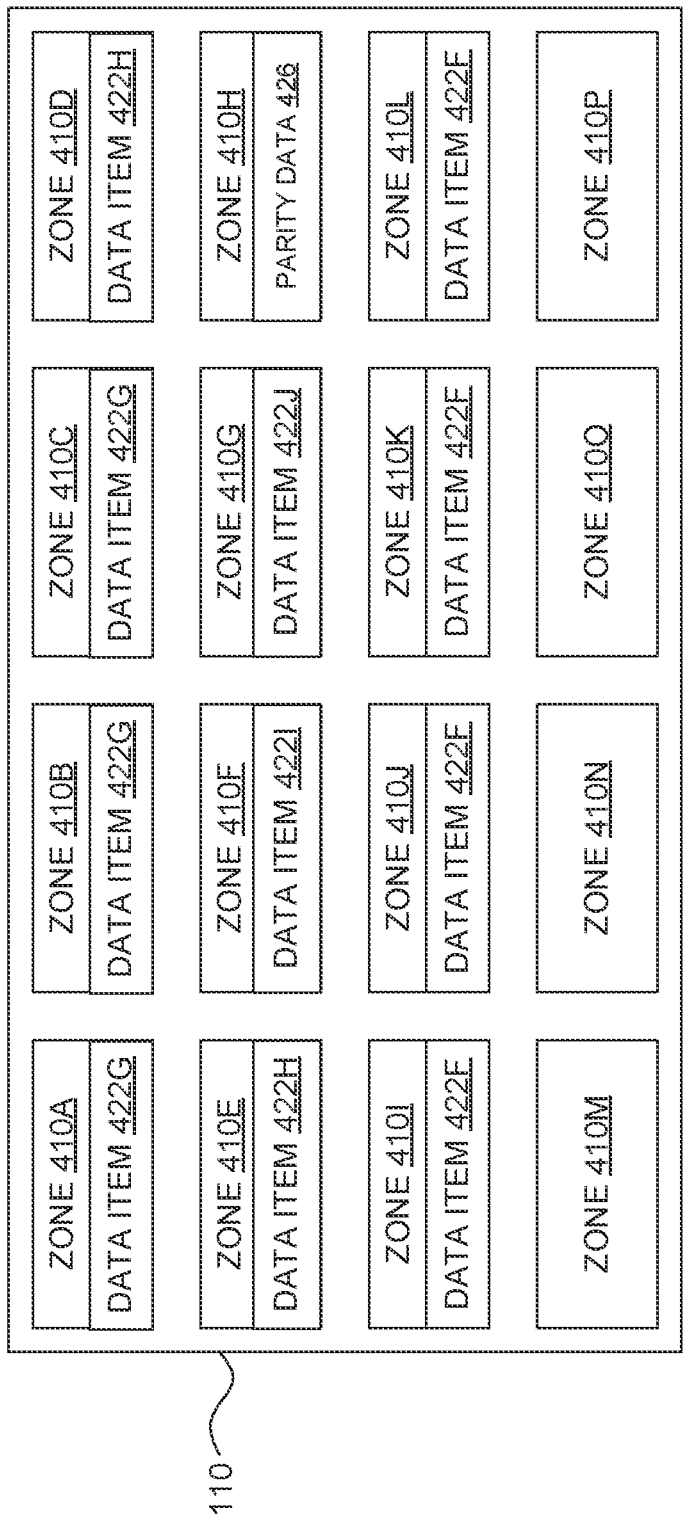

Zone group manager 122 can update programming commands associated with data items 422H-422J and parity data 426 to include an indication of an identifier for zone group "C," as previously described, and can transmit the programming commands to memory sub-system 110. Zone manager 113 can identify a set of zones across memory sub-system 110 that satisfy the parallelism criterion in view of a size of zone group "C," as described above. For example, zone manager 113 can identify reset zones 410A-410H as a set of zones that satisfy the parallelism criterion in view of the size of zone group "C." Accordingly, zone manager 113 can program data items 422H-422J to memory cells of zones 410A-410H, as illustrated in FIG. 4D.

Figure 5:
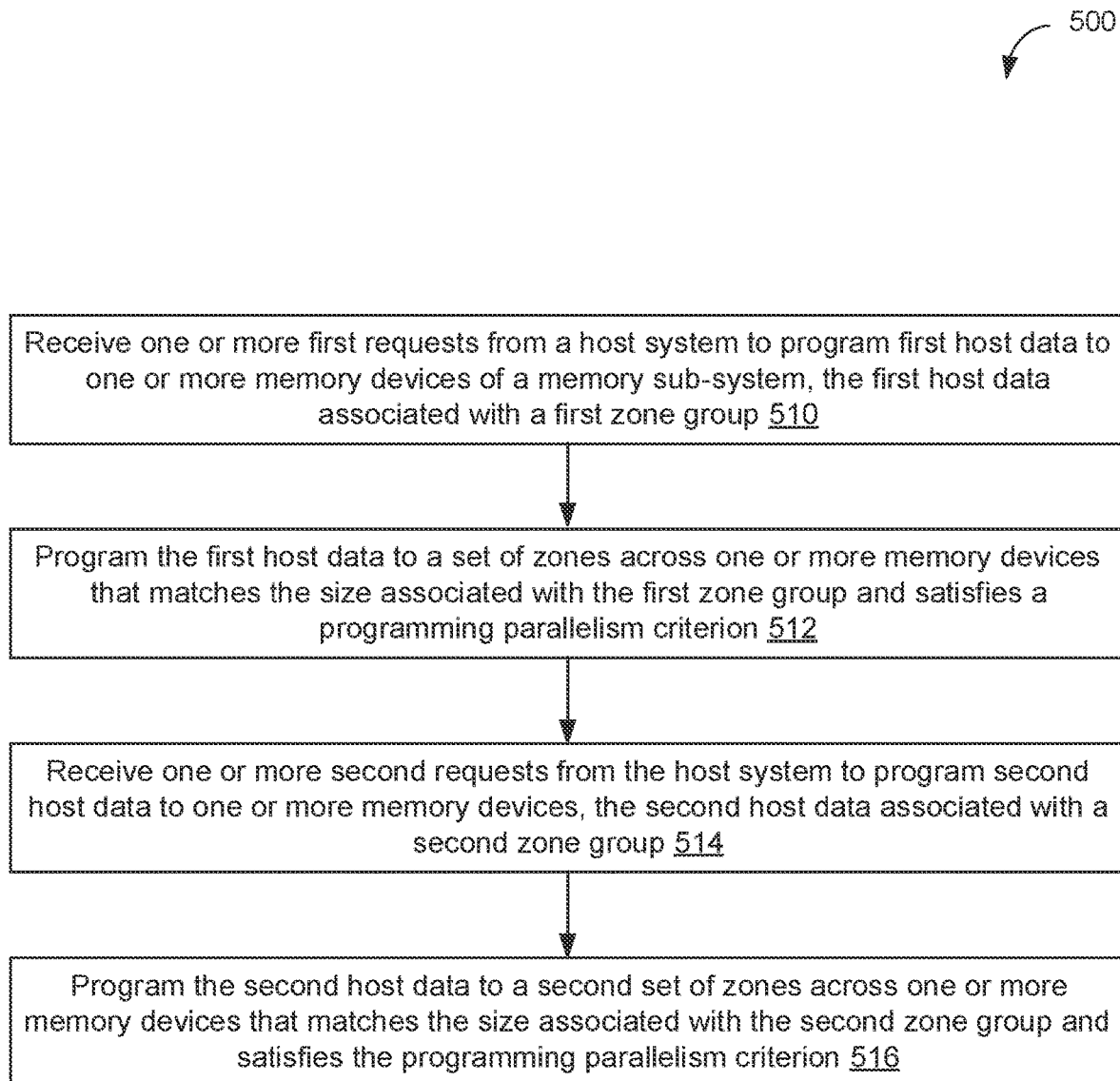
FIG. 5 is a flow diagram of yet another example method for dynamic zone group configuration at a memory sub-system by a host system, in accordance with some embodiments of the present disclosure.

FIG. 5 is a flow diagram of yet another example method 500 for dynamic zone group configuration at a memory sub-system by a host system, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 500 are performed by a component of memory sub-system controller 115 of FIG. 1. For example, one or more operations of method 500 can be performed by zone manager 113. One or more operations of method 500 is performed by another component of the memory sub-system controller 115, or by a component of local media controller 135, in additional or alternative embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 510, processing logic receives one or more first requests from a host system to program first host data to one or more memory devices of a memory sub-system. The first host data can be associated with a first zone group. Processing logic (e.g., zone manager 113) can determine that the first host data associated with the one or more first requests is associated with the first zone group in view of a common zone group identifier associated with the first host data, in accordance with previously described embodiments.

At block 512, processing logic programs the first host data to a set of zones across one or more memory devices that satisfies a parallelism criterion in view of a size of the first zone group. Zone manager 113 can identify the set of zones across one or more memory devices that satisfy the parallelism criterion in view of the size of the first zone group, in accordance with previously described embodiments. In some embodiments, zone manager 113 can receive each of the first requests associated with programming the first host data at or around the same time period. For example, zone group manager 122 can receive a single request to program the first host data, where the first host data is associated with the first zone group and no other host data is associated with the zone group. Accordingly, zone manager 113 can determine the size of the first zone group based on the amount of host data associated with the single request and can identify a set of zones that satisfy a parallelism criterion in view of the determined size. Zone manager 113 (or another component of memory sub-system controller 115) can program the first host data to the identified set of zones, in accordance with previously described embodiments.

In another example, zone manager 113 can receive a first portion of the one or more first requests at or around a first time period and a second portion of the one or more first requests at or around a second time period. When zone manager 113 receives the first portion of the first requests, zone manager 113 may not know whether additional requests to program additional data associated with the first zone group will be received. Accordingly, zone manager 113 may not determine the size of the first zone group based on the size of the host data associated with the first portion of the first requests. Accordingly, zone manager 113 can temporarily store the data associated with the first portion of the first requests in a memory cache. The memory cache can reside on one or more portions of memory devices 130, 140, at local memory 119, or another portion of memory sub-system 110. Zone manager 113 can continue to store data associated with the first zone group at the memory cache until zone manager 113 receives a request to program host data associated with another zone group to memory sub-system 110. Once zone manager 113 receives a request to program host data associated with the other zone group, zone manager 113 can determine that all of the first host data associated with the first zone group has been received and can determine the size of the first zone group based on the amount of first host data received. Zone manager 113 can identify the set of zones that satisfies the parallelism criterion in view of the determined size of the first zone group and can program the first host data to the identified set of zones, in accordance with previously described embodiments.

In yet another example, zone manager 113 can receive a notification from host system 120 prior to receiving the one or more first requests associated with programming the first host data. The notification can indicate an amount of incoming first host data that is to be included in a respective zone group (e.g., associated with the incoming first requests). Zone manager 113 can determine the size of the first zone group based on the notification and can identify the set of zones that satisfy the parallelism criterion in view of the determined size, as described above. In such embodiments zone manager 113 can identify the set of zones that satisfies the parallelism criterion before each of the first requests associated with programming the first host data is received. As the first requests associated with programming the first host data is received, zone manager 113 (or another component of memory sub-system controller 115) can program the first host data to memory cells of the identified zones. Once host data is programmed to each memory cell of the identified set of zones, zone manager 113 can determine that no additional host data associated with the first zone group is to be received. Accordingly, zone manager 113 can identify another set of zones to be associated with a second zone group, in accordance with embodiments described herein.

At block 514, processing logic receives one or more second requests to program second host data to the one or more memory devices. The second host data can be associated with a second zone group. The second zone group can be associated with a size that is different than a size of the first zone group, in some embodiments. Zone manager 113 can determine that the second host data is associated with the second zone group, in accordance with previously described embodiments. At block 516, processing logic programs the second host data to a second set of zones across one or more memory devices that matches the size associated with the second zone group and satisfies the programming parallelism criterion in view of the size associated with the second zone group. Zone manager 113 can identify the second set of zones that satisfies the programming parallelism criterion in view of the size of the second zone group, as described above.

Figure 6:
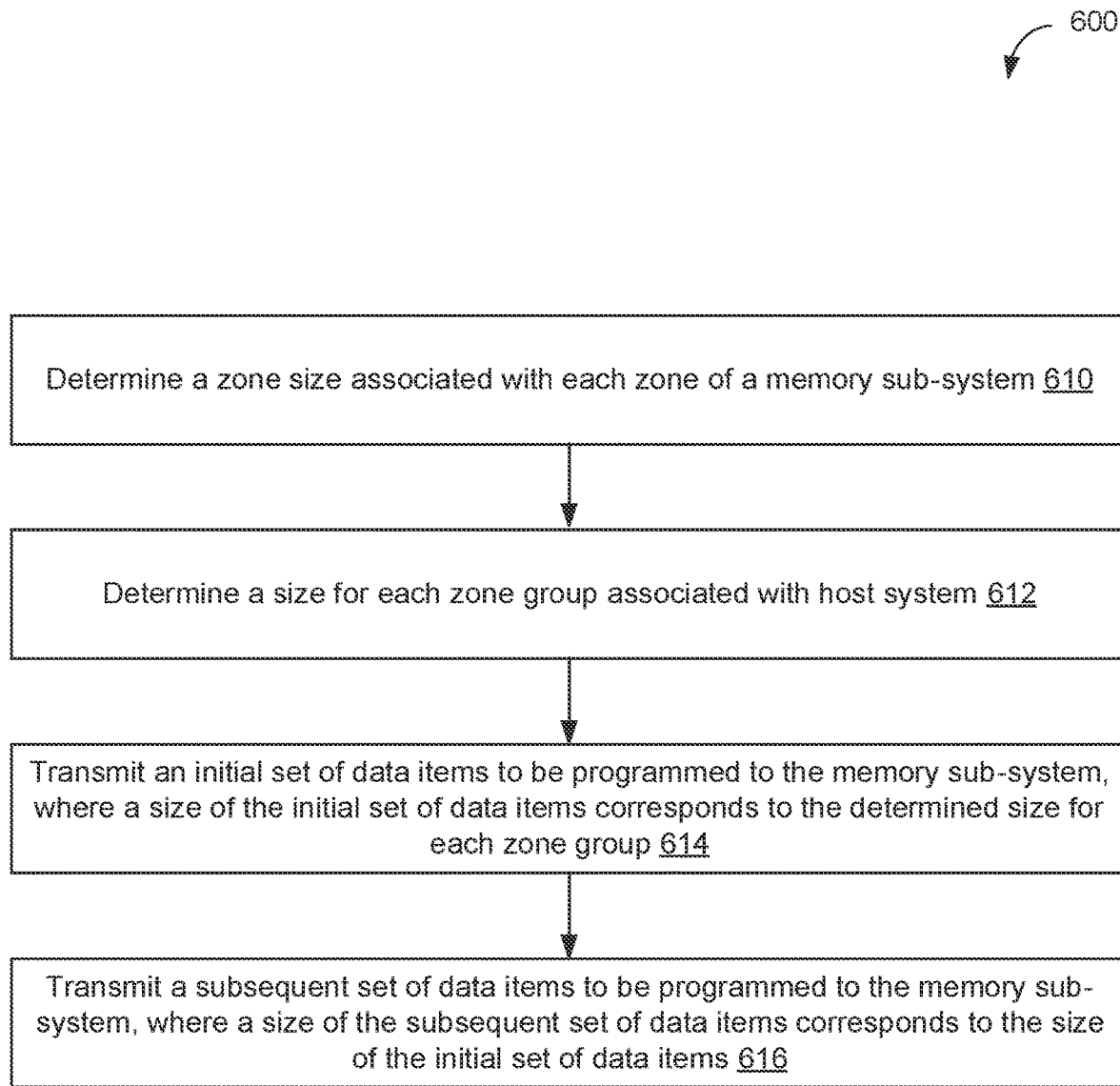
FIG. 6 is a flow diagram of an example method for host defined zone group configuration at a memory sub-system, in accordance with some embodiments of the present disclosure.

FIG. 6 is a flow diagram of an example method 600 for host defined zone group configuration at a memory sub-system, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 600 are performed by host system 120 of FIG. 1. For example, one or more operations of method 600 can be performed by zone group manager 122. One or more operations of method 600 is performed by a component of the memory sub-system controller 115 (e.g., zone manager 113), or by a component of local media controller 135, in additional or alternative embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 610, processing logic can determine a zone size associated with each zone of a memory sub-system. Processing logic (e.g., zone group manager 122 can determine the zone size in accordance with embodiments described with respect to FIGS. 2-4D. At block 612, processing logic can determine a size for each zone group associated with host system 120. In some embodiments, zone group manager 122 can determine a size for each zone group in view of one or more zone group criteria associated with data at host system 120. In one example, zone group manager 122 can determine that most if not all data at host system 120 is associated with a particular type of IO workload. For instance, zone group manager 122 can determine (e.g., based on an indication provided by a user of host system 120) that most if not all data at host system 120 is associated with one or more applications where the one or more applications are associated with a particular type of IO workload. Accordingly, zone group manager 122 can determine that most if not all data at host system 120 is associated with the particular type of IO workload. Zone group manager 122 can determine, in view of the determined type of IO workload, an amount of host data that is to be associated with each zone group. In some embodiments, zone group manager 122 can determine the amount of host data to be associated with each zone group based on an indication received from host system 120 (e.g., by the user of host system 120, etc.). In other or similar embodiments, zone group manager 122 can determine the amount of host data to be associated with each zone group in view of one or more zone grouping rules (e.g., defined and/or provided by a user of host system 120, determined based on experimental or testing data associated with host system 120 or other or similar host systems, etc.).

In additional or alternative examples, host system 120 can support a file storage system. Zone group manager 122 can determine the size associated with each zone group based on a size of each file (or sets of files) associated with the file storage system. For instance, zone group manager 122 can determine a number of files to be included in each zone group associated with host system 120 (e.g., in response to an indication provided to host system 120 by a user of host system 120, a developer of host system 120, etc.). Zone group manager 122 can determine a size associated with each file to be included in each zone group and can determine the size of each zone group based on the determined file size(s).

Figure 8A:
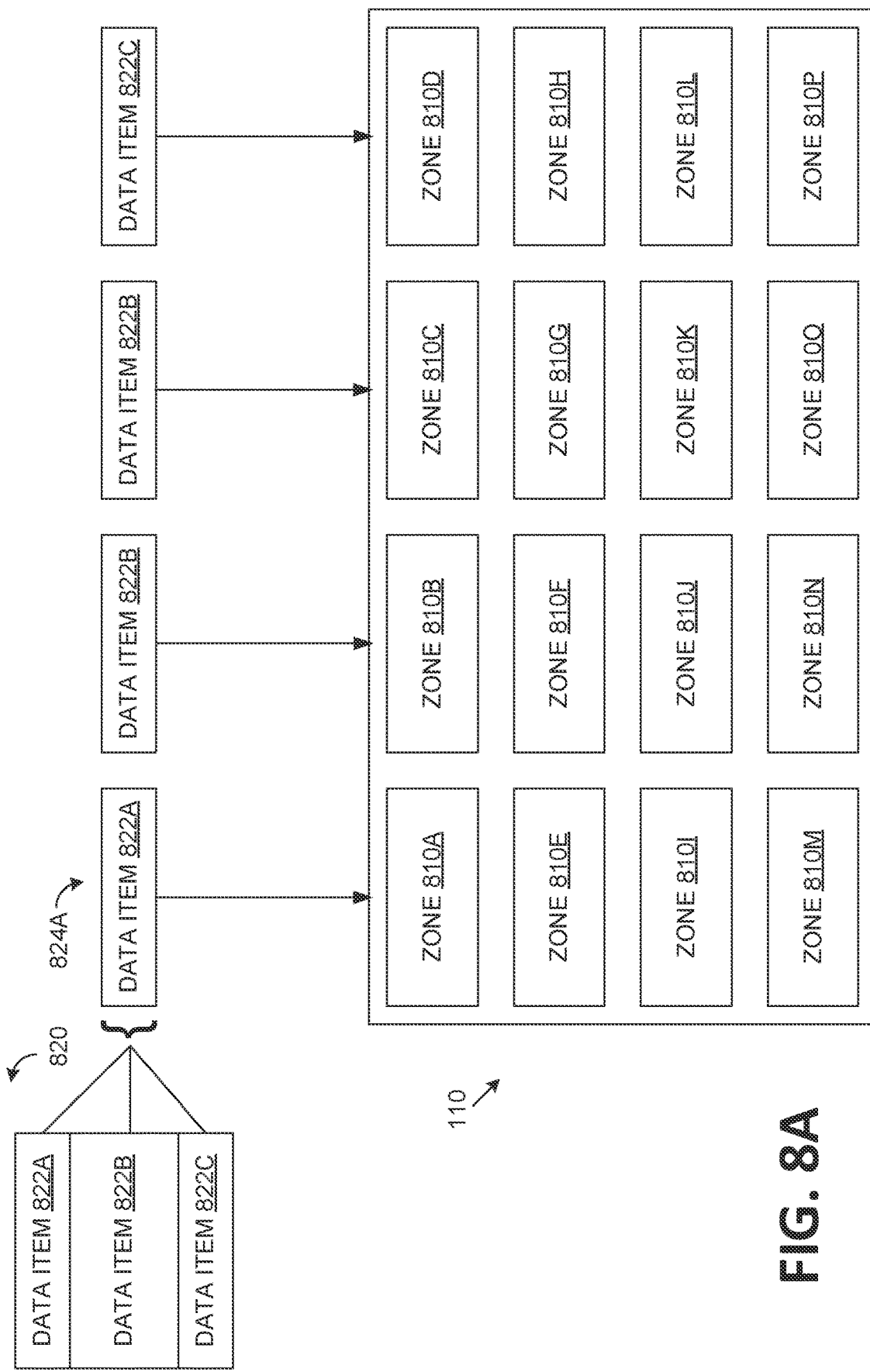
FIGS. 8A-8D depict an example of host defined zone group configuration at a memory sub-system, in accordance with some embodiments of the present disclosure.

FIG. 8A illustrates example zones across memory devices 130, 140 of memory sub-system 110, in accordance with some embodiments of the present disclosure. As illustrated in FIG. 8A, memory sub-system 110 can include one or more zones 810 (e.g., zones 810A-810P) across memory devices 130, 140 (not shown in FIG. 8A). It should be noted that, in some embodiments, the size of each zone 810 can correspond to a respective memory device 130, 140 of memory sub-system 110. In other or similar embodiments, the size of each zone 810 can correspond to a portion (e.g., one or more planes, blocks, etc.) residing at a respective memory device 130, 140. Zone manager 113 can configure each zone to be the same size, as described above. Additionally or alternatively, zone manager 113 can configure each zone to include one or more erasable units (e.g., blocks, etc.). An erasable unit may not span two or more zones. Zones 810 described with respect to FIGS. 8A-8D can correspond to zones 410 described with respect to FIGS. 4A-4D, in some embodiments.

As described above, zone manager 113 can transmit a notification to host system 112 indicating a size of each zone 810 of memory sub-system 110. In one illustrative example, each zone can have a size of approximately 4 KB. Zone group manager 122 can determine the size of each zone based on the indication received by host system 120 by zone manager 113. In one example, zone group manager 122 can determine that a size of each zone group is to be approximately 16 KB, in accordance with previously described embodiments. Zone group manager 113 can define the size for each zone group by configuring an initial zone group having a size of 16 KB. Zone group manager 113 can create a zone stripe 824A associated with the initial zone group. A size of each portion of zone stripe 824A can correspond to the size of a respective zone 810 of memory sub-system 110. As illustrated in FIG. 8A, zone stripe 824A can include four portions each having a size of approximately 4 KB. Accordingly, the initial zone group can have a size of approximately 16 KB.

As described above, zone group manager 122 can configure the initial zone group to define a zone group size for each zone group associated with host system 120. In some embodiments, zone group manager 122 can associate invalid data (e.g., dummy data) with each portion of zone stripe 824A. For example, zone group manager 122 can generate 16 KB of invalid data (e.g., all "0s," all "1s," etc.) and associate 4 KB of the 16 KB of invalid data with each portion of zone stripe 824A. In other or similar embodiments, zone group manager 122 can identify data (e.g., valid data) from a data queue 820 and can associated the identified data with each portion of zone stripe 824A. For example, zone group manager 122 can identify data items 822A-822C from queue 820. A size of data items 822A and 822C can be approximately 4 KB each. A size of data item 822B can be approximately 8 KB. Accordingly, a total size of data items 822A-822C can be approximately 16 KB. Zone group manager 113 can associate each of data items 822A-822C with one or more of portions of zone stripe 824A. For example, zone group manager 122 can associate data item 822A with a first portion of zone stripe 824A. Zone group manager 122 can partition data item 822B into two-4 KB portions of data, as described above. As illustrated in FIG. 8A, zone group manager 122 can associate a first portion of data item 822B with a second portion of zone stripe 824A and a second portion of data item 822B with a third portion of zone stripe 824A. Zone group manager 122 can associate data item 822C with a fourth portion of zone stripe 824A. It should be noted that zone group manager 122 can define an ordering of data items 822A-822C across zone stripe 824A, in accordance with previously described embodiments. It should also be noted that zone group manager 122 can generate parity data associated with one or more of data items 822A-822C and can associate the generated parity data with one or more portions of zone stripe 824A. Further details regarding generating parity data are provided with respect to FIGS. 8C-8D.

Referring back to FIG. 6, at block 614, processing logic (e.g., zone group manager 122) can transmit an initial set of data items to be programmed to the memory sub-system (e.g., memory sub-system 110). As indicated above, a size of the initial set of data items corresponds to the size for each zone group associated with host system 120 (e.g., determined by processing logic in accordance with block 612). Zone group manager 113 (or another component of host system 120) can transmit one or more programming commands to memory sub-system 110 to cause memory sub-system controller 115 to program the initial set of data items to memory sub-system 110. As the size of the initial set of data items corresponds to the size for each zone group associated with host system 120, each data item included in the initial set of data items is included in the same zone group. Accordingly, zone group manager 122 may not update the programming commands to include an indication of a common zone group identifier associated with the initial set of data items (e.g., to indicate to memory sub-system controller 115 that the initial set of data items are included in the same zone group).

Figure 7:
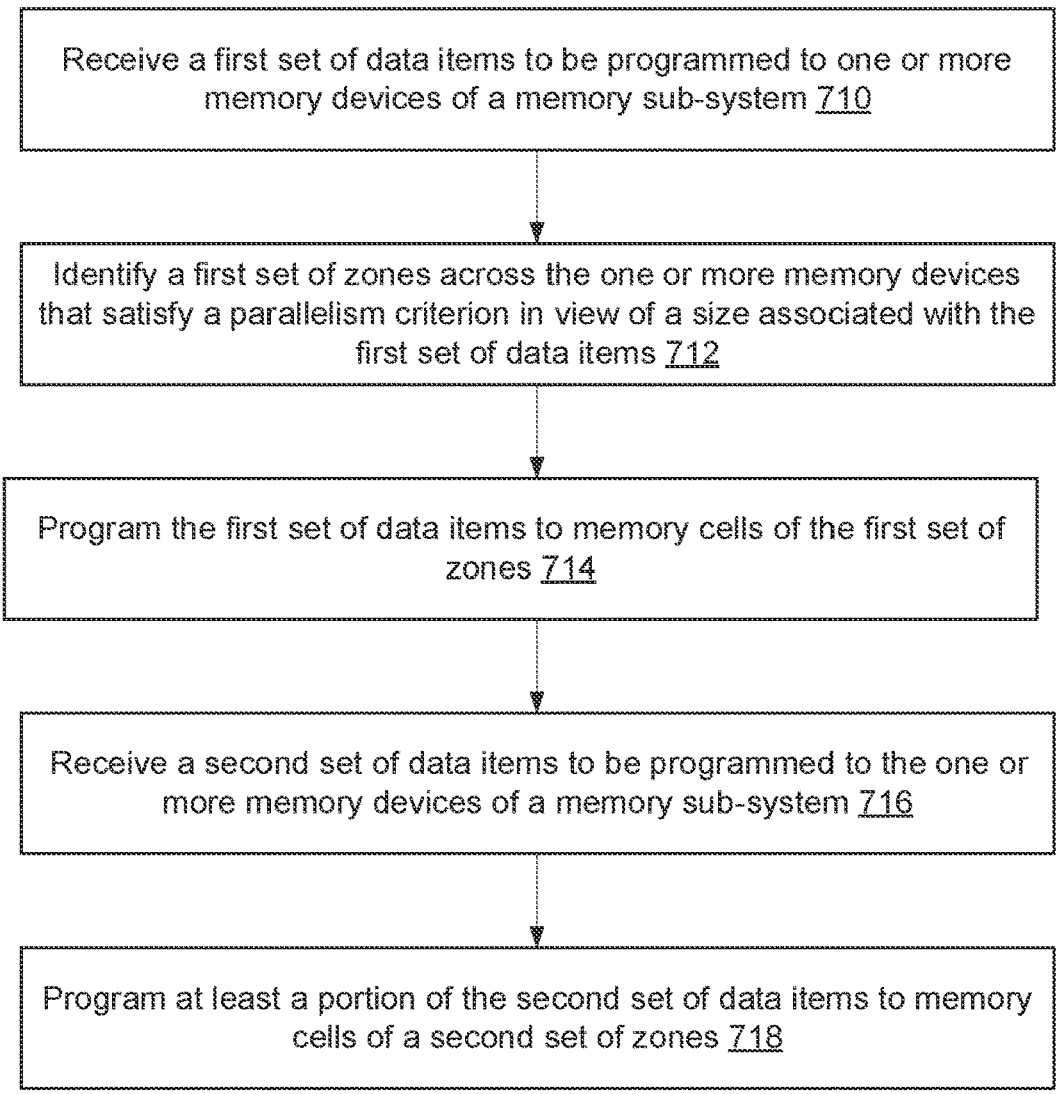
FIG. 7 is another flow diagram of an example method for host defined zone group configuration at a memory sub-system, in accordance with some embodiments of the present disclosure.
Figure 8B:
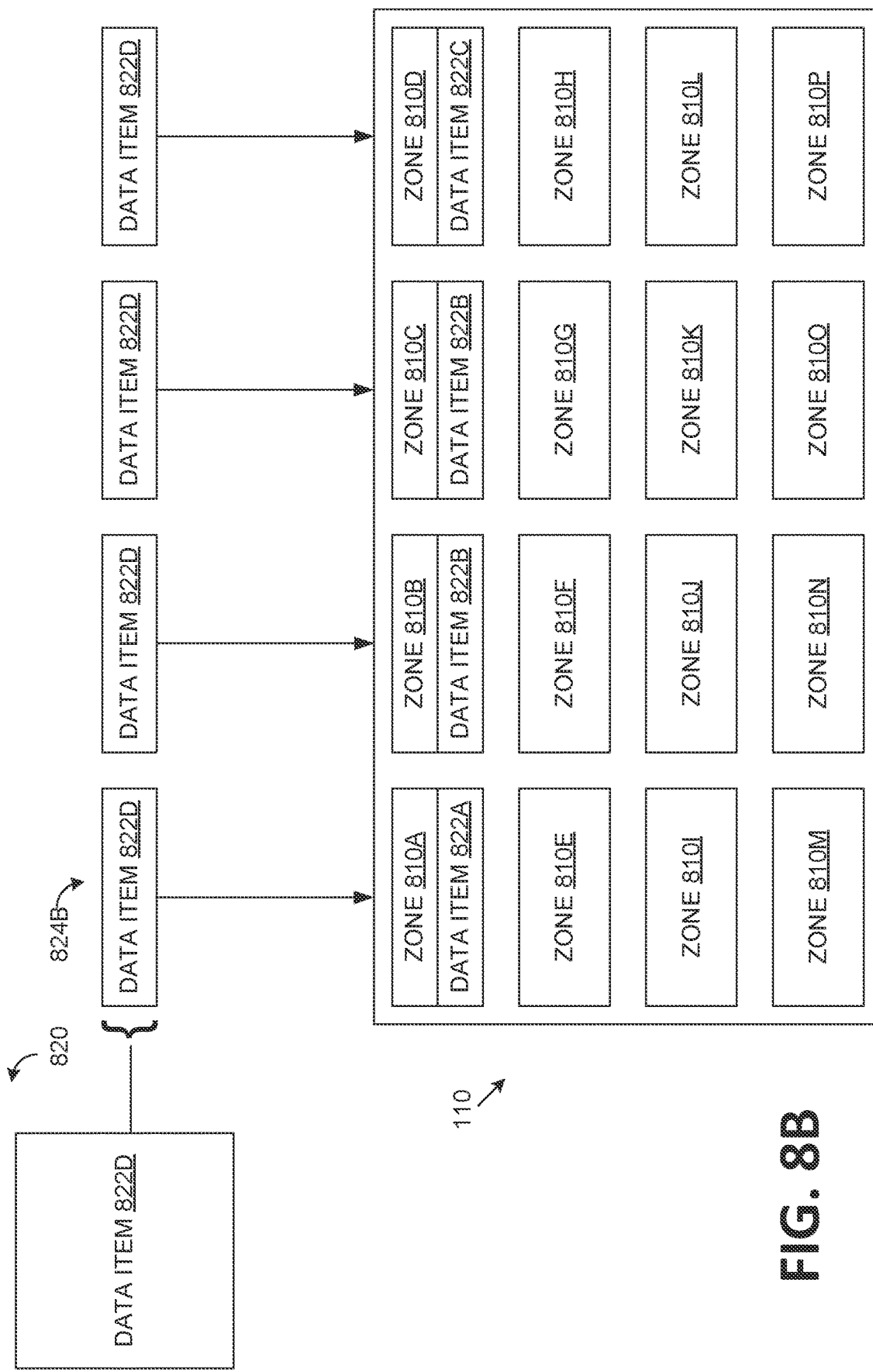

One or more components of memory sub-system controller 115 (e.g., zone manager 113) can identify a set of zones across memory sub-system 110 (e.g., e.g., zones 810A-810D) and program the initial set of data items to memory cells of the identified set of zones, as illustrated in FIG. 8B. Further details regarding zone manager 113 and/or other components of memory sub-system controller 115 identifying the set of zones and programming the initial set of data items are provided with respect to FIGS. 7-9. As described above, in some embodiments, the initial set of data items can include invalid data (e.g., dummy data) that does not correspond to any data for applications running on host system 120. In such embodiments, zone group manager 122 (or another component of host system 120) can transmit a reset command to memory sub-system 110 to cause memory sub-system controller 115 to reset the set of zones that stores the initial set of data items. In some embodiments, zone group manager 122 can transmit the reset command with, immediately after transmitting, or soon after transmitting the initial set of data items for programming.

At block 616, processing logic (e.g., zone group manager 122) can transmit a subsequent set of data items to be programmed to the memory sub-system (e.g., memory sub-system 110). A size of the subsequent set of data items corresponds to the size of the initial set of data items (and the size for each zone group determined by processing logic in accordance with block 612). In accordance with the previously provided examples, after configuring the initial zone group and transmitting the initial set of data items associated with the initial zone group to be programmed to memory sub-system 110, zone group manager 122 can configure another zone group (referred to as a subsequent zone group herein) and associate additional data items with the subsequent zone group. For example, zone group manager 122 can create zone stripe 824B for the subsequent zone group and can identify data items in queue 820 to be associated with the subsequent zone group. As illustrated in FIG. 8B, queue 820 can include data item 822D. A size of data item 822D can be approximately 16 KB.

Responsive to identifying data item 822D, zone group manager 122 can associate portions of data item 822D with respective portions of zone stripe 824B, as described above. For example, each portion of zone stripe 824B can be approximately 4 KB (e.g., in accordance with the size of each zone 810 of memory sub-system 110). Accordingly, zone group manager 122 can partition data item 822D into four-4 KB portions. Zone group manager 122 can associate each portion of partitioned data item 822D with a respective portion of zone stripe 824B, in accordance with previously described examples and embodiments.

Zone group manager 113 can transmit the subsequent set of data items to memory sub-system 110 to cause memory sub-system controller 115 to program the subsequent set of data items to zones across memory sub-system 110, as described above. Further details regarding zone manager 113 and/or other components of memory sub-system controller 115 identifying the set of zones and programming the subsequent set of data items are provided with respect to FIGS. 7-9.

Zone manager 113 can determine the size of each zone group associated with host system 120 based on the size of the initial set of data items and/or the subsequent set of data items, as described above. Accordingly, in response to receiving a request to program a set of data items to memory sub-system 110, zone manager 113 can identify a set of zones that satisfy a parallelism criterion in view of the fixed zone group size (e.g., defined by host system 120) and can open the identified set of zones to store the set of host data items, in accordance with embodiments described below. In some embodiments, zone group manager 122 (or another component of host system 12) may not transmit data items within a particular time period that corresponds to the fixed size of the zone group. For example, host system 120 can transmit to memory sub-system 110 a request to program a data item having a size of 4 KB, where the fixed zone group size is approximately 16 KB. Zone manager 113 can open a set of zones to store the data item, in accordance with embodiments described below, and can program the data item to memory cells of the opened set of zones. When zone manager 113 receives additional data items from host system 120, zone manager 113 can program the data items to the available memory cells of the opened set of zones until each memory cell is programed. Once each memory cell of the opened set of zones is programmed, zone manager 113 can close the set of zones (e.g., update data and/or metadata associated with the set of zones to indicate the zones unavailable to store additional data) and can open another set of zones to store incoming host data, in accordance with embodiments described herein. The size of each set of zones that is opened by zone manager 113 can correspond to the zone group size defined by host system 120 (e.g., throughout the lifetime of host system 120 and/or memory sub-system 110).

FIG. 7 is a flow diagram of another example method 700 for host defined zone group configuration at a memory sub-system by a host system, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 700 are performed by a component of memory sub-system controller 115 of FIG. 1. For example, one or more operations of method 700 can be performed by zone manager 113. One or more operations of method 700 is performed by another component of the memory sub-system controller 115, or by a component of local media controller 135, in additional or alternative embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 710, processing logic receives a first set of data items to be programmed to one or more memory devices of a memory sub-system. In some embodiments, the first set of data items can correspond to the initial of host data items described with respect to FIGS. 6 and 8A. For example, the first set of data items can include data items 822A-822C, as described above. A size of the first set of data items can be approximately 16 KB, in accordance with previously provided examples. In some embodiments, processing logic (e.g., zone manager 113) can receive the first request during an initialization period at the memory sub-system 110. In other or similar embodiments, the request received by processing logic (e.g., zone manager 113) can be the first programming request received from host system 120 (e.g., after completion of the initialization period). In such embodiments, zone manager 113 can determine the size of the set of host data items and can associate the determined size as a fixed zone group size for all zone groups associated with host system 120. In an illustrative example, zone manager 113 can maintain a metric (also referred to herein as a zone group size metric) that indicates the fixed zone group size defined by host system 120. Zone manager 113 can store the metric at local memory 119 (e.g., in a data structure, etc.), in some embodiments. Zone manager 113 can update the metric to correspond to the determined fixed zone group size responsive to receiving the first request from host system 120, in some embodiments. In accordance with the examples provided with respect to FIGS. 6 and 8A-8B, zone group manager 122 can define the fixed zone group size to be approximately 16 KB (e.g., in view of the size of the first set of data items being 16 KB). Accordingly, zone manager 113 can update the metric to indicate that each zone group associated with host system 120 is approximately 16 KB. As each zone configured by zone manager 113 is approximately 4 KB, each zone group opened by zone manager 113 can include four-4 KB zones.

At block 712, processing logic can identify a first set of zones across the one or more memory devices that satisfy a parallelism criterion in view of a size associated with the first set of host data items. As described above, a set of zones can satisfy a parallelism criterion if the data items associated with a respective zone group can be programmed to memory cells of the set of zones using a single programming operation (or a minimal number of programming operations). Processing logic (e.g., zone manager 113) can identify the set of zones that satisfy the parallelism criterion in accordance with embodiments described above. In accordance with embodiments described with respect to FIG. 8A, zone manager 113 can determine that zones 810A-810D satisfy the parallelism criterion (e.g., as zones 810A-810D reside on different memory devices 130, 140 and/or are connected via different memory channels and accordingly memory cells of zones 810A-810D can be programmed in a single or minimal number of programming operations). At block 714, processing logic can program the set of data items to memory cells of the identified first set of zones. As illustrated in FIG. 8B, processing logic (e.g., zone manager 113) can program the set of initial data items to memory cells of zones 810A-810D. As described above, in some embodiments the initial set of data items can include invalid data (e.g., dummy data). In such embodiments, zone manager 113 can receive (e.g., immediately or soon after receiving the first request) a request to reset the data associated with the initial set of data items. Zone manager 113 (or another component of memory sub-system controller 115) can reset the memory cells of zones 810A-810D, in accordance with the request, in some embodiments.

At block 716, processing logic can receive a second set of data items to be programmed to the one or more memory devices of memory sub-system 110. The second set of data items can correspond to the subsequent set of data items described with respect to FIGS. 6 and 8B. A size of the second set of data items can correspond to the size of the first set of data items, in accordance with previously described embodiments. In accordance with previously provided examples, the subsequent set of data items can include data item 822D, which has a size of approximately 16 KB. At block 718, processing logic can program at least a portion of the second set of data items to memory cells of a second set of zones. Zone manager 113 can identify a second set of zones across the one or more memory devices that satisfy the parallelism criterion in view of the size associated with the first set of data items. As described above, zone group manager 122 can define the size of each zone group by configuring a zone group of the target size and transmitting a set of data items (e.g., the first set of data items) to memory sub-system 110 to inform zone manager 113 of the defined size. Accordingly, in response to receiving the second request to program the second set of data items to memory sub-system 110, zone manager 113 can identify the set of zones that satisfy the parallelism criterion in view of the size of the first set of data items (i.e., the fixed zone group size). As described above, zone manager 113 can maintain a metric that indicates the fixed zone group size for each zone group associated with host system 120. Zone manager 113 can reference the metric (e.g., in response to the second request) and can open a set of zones that satisfy the parallelism criterion in view of the fixed zone group size. Zone manager 113 can identify the set of zones that satisfy the parallelism criterion in accordance with previously described embodiments.

Figure 8C:
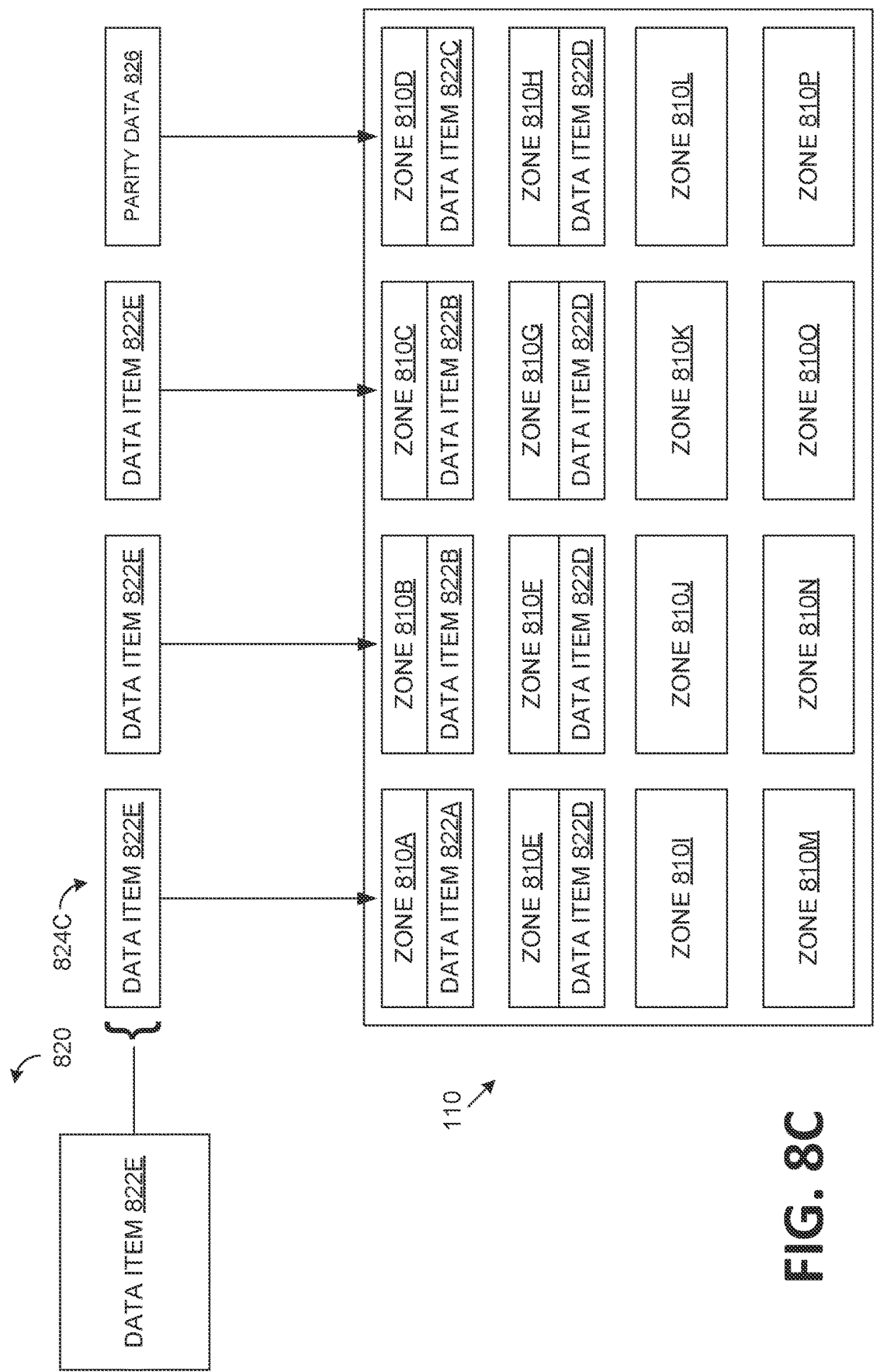

Zone manager 113 can identify zones 810E-810H as zones that satisfy the parallelism criterion in view of the fixed zone group size associated with host system 120. Accordingly, zone manager 113 (or another component of memory sub-system controller 115) can program data item 822D to zones 810E-810H, as illustrated in FIG. 8C.

Figure 8D:
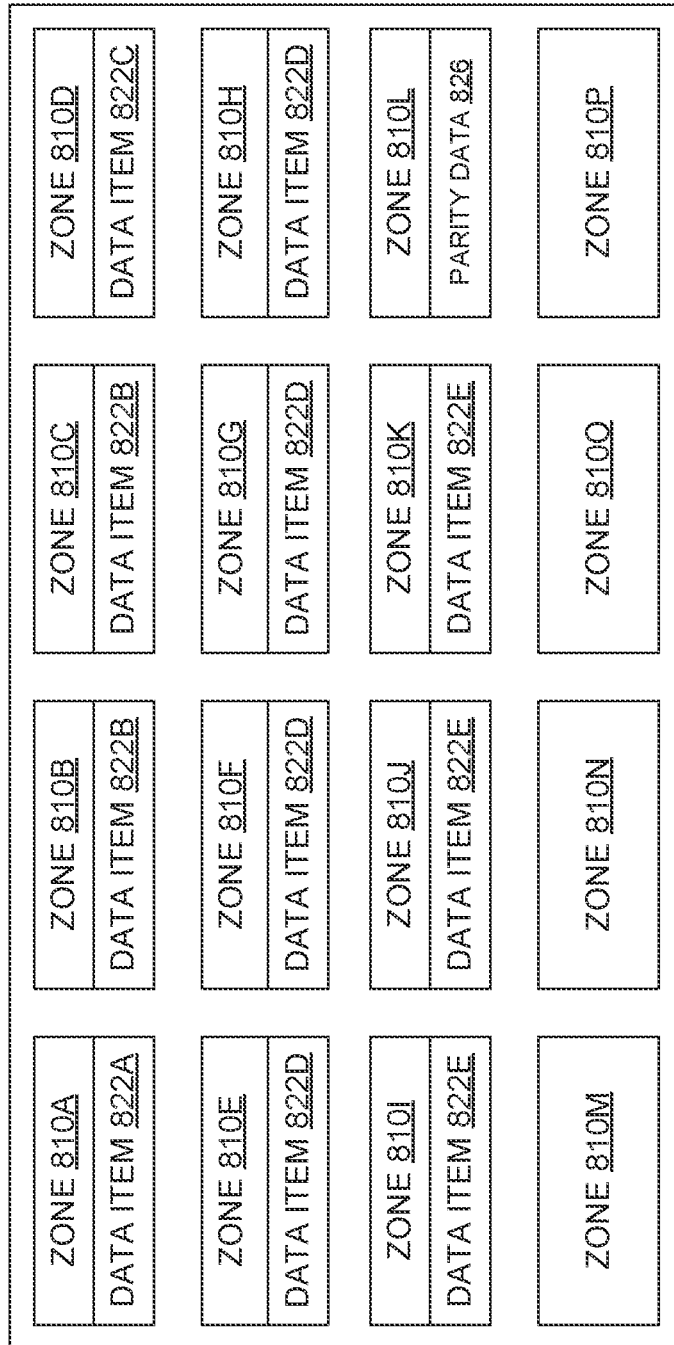

As described above, zone group manager 122 can generate parity data associated with one or more data items of a respective zone group. For example, as illustrated in FIG. 8C, zone group manager 122 can configure an additional zone group and can create a zone stripe 824C for the additional zone group. In accordance with previous examples, each portion of zone stripe 824C can have a size of approximately 4 KB. Zone group manager 122 can identify data item 822E in queue 820. Data item 822E can be 12 KB, in some embodiments. Zone group manager 122 can partition data item 822E into three-4 KB data portions and can associate each portion of data item 822E with a respective portion of zone stripe 824C. In some embodiments, zone group manager 122 can generate parity data 826 associated with data item 822E and can associate parity data 826 with a portion of zone stripe 824C. Zone group manager 122 can generate the parity data 826 in accordance with a data recovery scheme (e.g., a RAID or RAIN 5 scheme, a RAID or RAIN 6 scheme, etc.), in accordance with previously described embodiments. Zone group manager 122 can transmit the one or more commands associated with programing data item 822E to memory sub-system controller 115, as described above. Zone manager 113 can identify a set of zones 810 across memory sub-system 110 to store data item 822E and parity data 826, as described above. For example, zone manager 113 can identify zones 810I-810L to store data item 822E and parity data 826. As illustrated in FIG. 8D, zone manager 13 can program data item 822E and parity data 826 to zones 810I-810L, in accordance with previously described embodiments.

Figure 9:
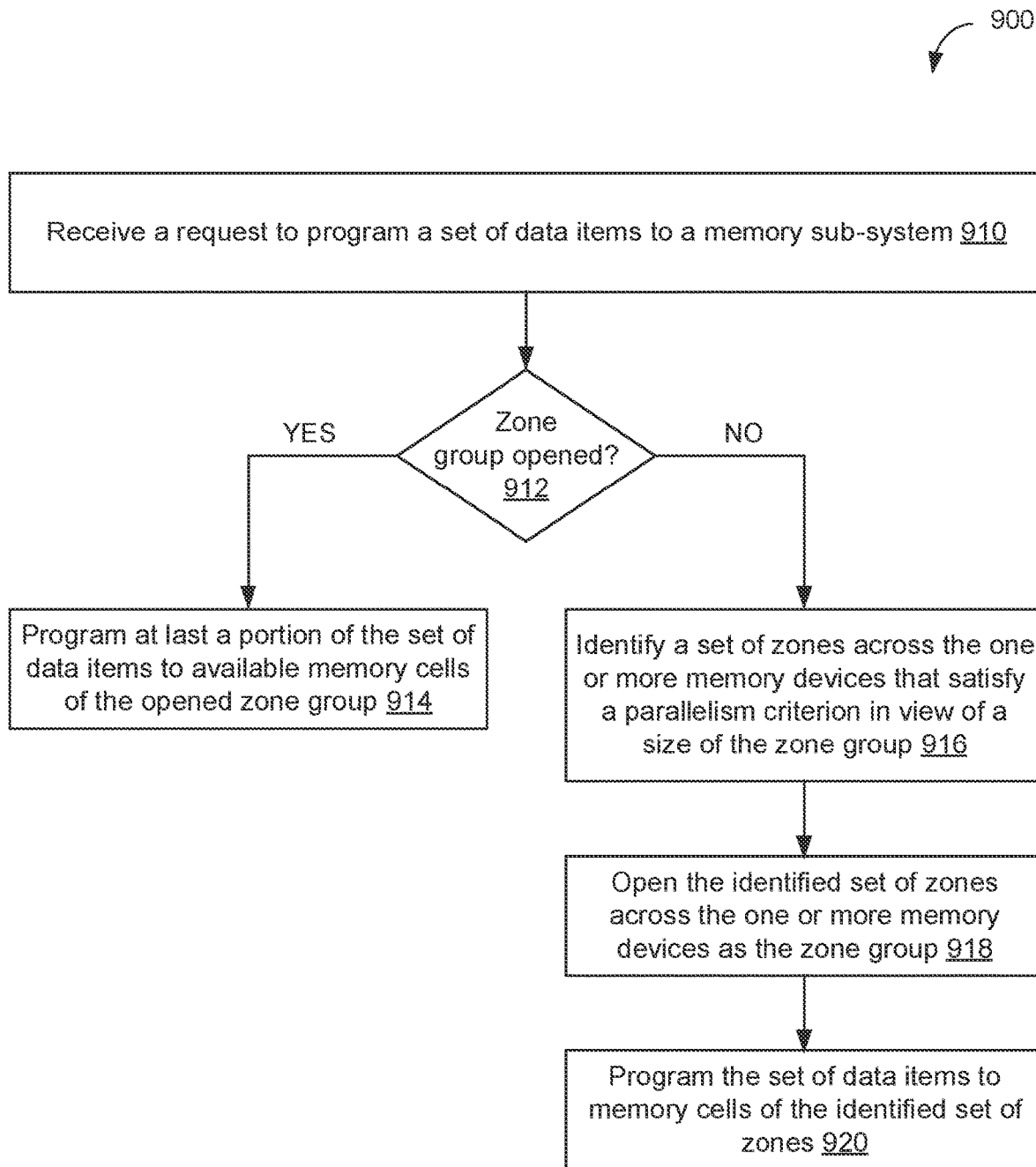
FIG. 9 is a flow diagram of yet another example method for host defined zone group configuration at a memory sub-system by a host system, in accordance with some embodiments of the present disclosure.

FIG. 9 is a flow diagram of yet another example method 900 for host defined zone group configuration at a memory sub-system by a host system, in accordance with some embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more operations of method 900 are performed by a component of memory sub-system controller 115 of FIG. 1. For example, one or more operations of method 900 can be performed by zone manager 113. One or more operations of method 900 is performed by another component of the memory sub-system controller 115, or by a component of local media controller 135, in additional or alternative embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 910, processing logic (e.g., zone manager 113) receives a request to program a set of host data items to a memory sub-system. The set of host data items can correspond to the initial set of data items and/or a subsequent set of data items, described with respect to FIGS. 6-8D. At block 912, processing logic determines whether a zone group is opened across one or more memory devices of memory sub-system 110 to store the set of host data items. Zone group manager 113 can maintain a pointer (e.g., a cursor) that indicates memory cells associated with an opened zone group across memory devices 130, 140. The pointer can include data or metadata that indicates a region of memory devices 130, 140 that includes the memory cells associated with the open zone group. In some embodiments, zone manager 113 can identify a set of zones across memory devices 130, 140 that satisfy a parallelism criterion in view of a size of zone groups associated with host system 120, as described above, and can open the group by updating the pointer to indicate memory cells associated with the identified set of zones. By updating the pointer to indicate the memory cells associated with the identified set of zone, zone group manager 113 marks the identified set of zones as available to store data items. Zone manager 113 can determine whether the pointer indicates memory cells is associated with a particular set of zones across memory devices 130, 140 and, if so, can determine that a zone group is opened at memory sub-system 110. In response to determining that no pointer is currently associated with memory cells across memory devices 130, 140, zone manager 113 can determine that no zone group is currently opened at memory sub-system.

Responsive to processing logic determining that the zone group is opened across the one or more memory devices of memory sub-system 110, method 900 can continue to block 914. At block 914, processing logic programs at least a portion of the set of data items to available memory cells of the opened zone group. In some embodiments, the size of the portion of the set of data items corresponds to the amount of available space at the zones associated with the opened zone group. Accordingly, zone manager 113 can program the portion of the set of data items to the memory cells of the opened zones to fill the zone group. Responsive to filling the zone group, zone manager 113 can update the pointer to indicate that the opened zone group is no longer available to store data items and the zone group is closed (e.g., by removing an association between the pointer and memory cells of the zone group). In some embodiments, zone manager 113 can open another zone group at memory sub-system 110 responsive to filling the zone group and can update the pointer to indicate the other zone group is now opened (e.g., by associating the pointer with the memory cells of the opened zone group). In other or similar embodiments, the size of the portion of the set of data items does not correspond to the amount of available space at the zones associated with the opened zone group. For example, the size of the portion of the set of data items can be smaller than the amount of available space at zones associated with the zone group. Accordingly, zone manager 113 can program the portion of the data items to available memory cells of the zone group and can update the pointer associated to indicate other cells o the zone group that are available to store incoming data items. Zone manager 113 does not close the zone group until data items are programmed to memory cells of each zone associated with the zone group.

Responsive to processing logic determining that the zone group is not opened across the one or more memory devices of memory sub-system 110, method 900 can continue to block 916. At block 916, processing logic identifies a set of zones across the one or more memory devices that satisfy a parallelism criterion in view of a size of the zone group. The size of the zone group can correspond to a fixed zone size for each zone group associated with host system 120, as described above. Zone manager 113 can identify the set of zones, in accordance with previously described embodiments. At block 918, processing logic opens the identified set of zones across the one or more memory devices as the zone group. Zone manager 113 can open the identified set of zones as the zone group by updating the pointer to indicate that memory cells of identified set of zones are available to store data items, in accordance with previously described embodiments. At block 920, processing logic programs the set of data items to memory cells of the identified set of zones. Zone manager 113 can program incoming data items to the available cells of zones associated with the zone group until the zone group is full, as described above.

Figure 10:
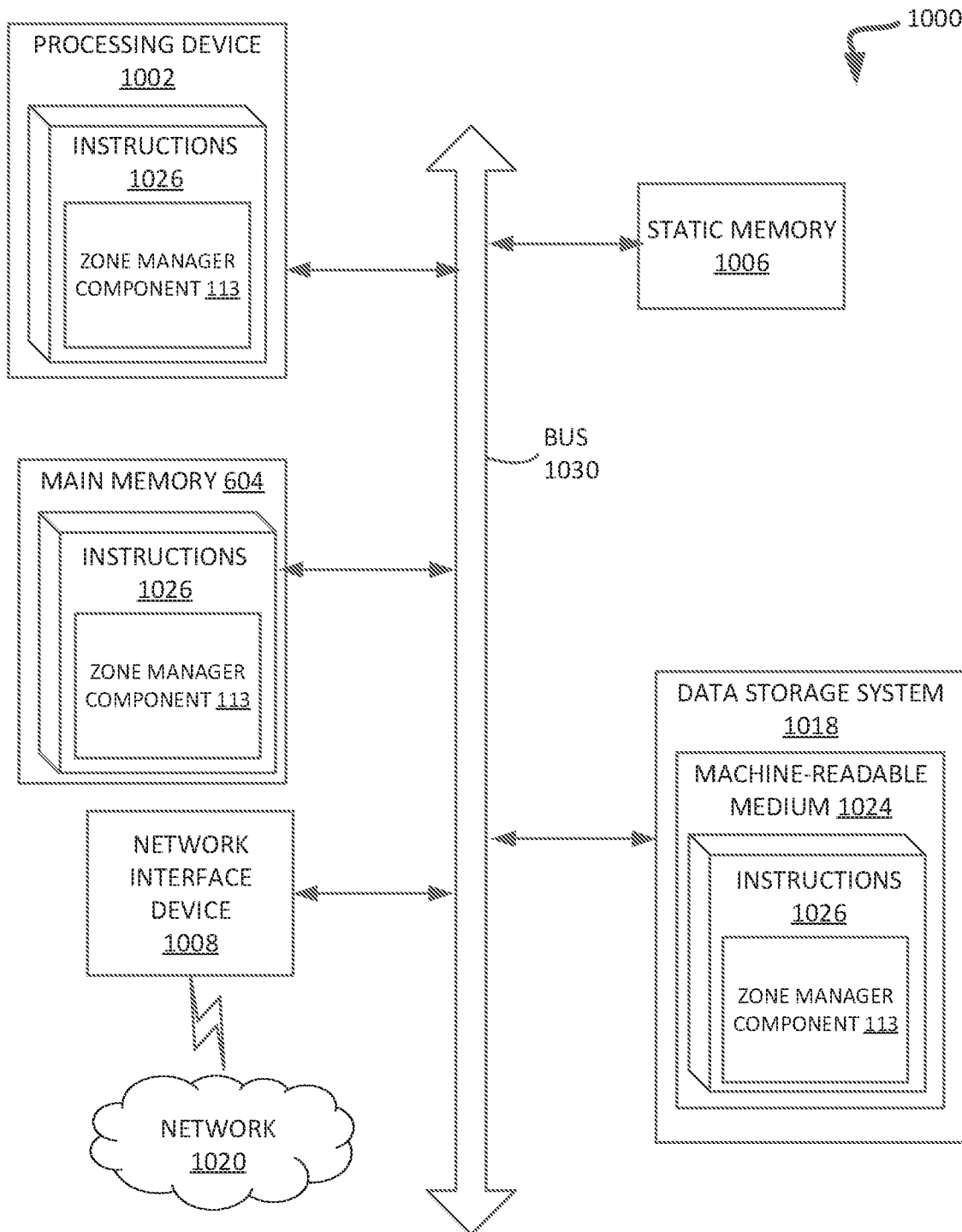
FIG. 10 is a block diagram of an example computer system in which embodiments of the present disclosure may operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the zone manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or RDRAM, etc.), a static memory 1006 (e.g., flash memory, static random access memory (SRAM), etc.), and a data storage system 618, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to memory sub-system 110 of FIG. 1.

In one embodiment, the instructions 1026 include instructions to implement functionality corresponding to a voltage bin boundary component (e.g., the zone manager component 113 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
one or more memory devices; and
a processing device coupled to each of the one or more memory devices, the processing device to perform operations comprising:
receiving from a host system, a first request to program a first set of data items from the host system to the one or more memory devices, wherein the first request comprises a first zone group identifier for a first zone group and a first signal defining a size of the first zone group, wherein at least one of the first set of data items comprises parity data;
determining, in view of the first zone group identifier of the first request that each data item of the first set of data items is allocated for storage at one or more zones associated with the first zone group;
identifying, of a plurality of zones residing across the one or more memory devices, a first set of zones having a combined size that matches at least a size of the first zone group defined by the first signal of the first request and satisfying a programming parallelism criterion; and
allocating the identified first set of zones to the first zone group based on the first request received from the host system; and
programming each of the first set of data items to memory cells residing at the identified first set of zones.

2. The system of claim 1, wherein the operations further comprise:
receiving, from the host system, a second request to program a second set of data items from the host system to the one or more memory devices, wherein the second request comprises a second zone group identifier for a second zone group, and a second signal defining a size of the second zone group, and wherein the size of the second zone group is different from the size of the first zone group;
determining, in view of the second zone group identifier of the second request, that each data item of the second set of data items is to be programmed to one or more zones associated with the second zone group defined by the host system;
identifying a second set of zones of the plurality of zones for inclusion in the second zone group, wherein a combined size of the second set of zones matches at least a size of the second zone group indicated by the second signal of the second request and satisfies the programming parallelism criterion; and
programming the second set of data items to memory cells residing at the identified second set of zones.

3. The system of claim 1, wherein the operations further comprise:
determining, in view of the combined size of the first set of zones, whether the first set of data items can be programmed to the first set of zones in parallel; and
responsive to determining that the first set of data items can be programmed to the first set of zones in parallel, determining that the first set of zones satisfy the programming parallelism criterion.

4. The system of claim 1, wherein the operations further comprise:
transmitting, to the host system, an indication of a zone size associated with each zone of the one or more memory devices, wherein the combined size of the first set of zones corresponds to a multiple of the indicated zone size.

5. The system of claim 1, wherein the first request is received at a first time period and at least a second request to program a second set of data items associated with the first zone group is received at a second time period, and wherein the operations further comprise:
caching the first set of data items at a memory cache until at least the second set of data items is received.

6. The system of claim 1, wherein the operations further comprise:
receiving an additional request, from the host system, to allocate zones across the one or more memory devices to the first zone group, wherein the additional request comprises an indication of the first zone group identifier and an indication of the size associated with the first zone group,
wherein the first set of zones is identified responsive to the additional request.

7. The system of claim 1, wherein determining that each of the first set of data items are included in the first zone group comprises:
   parsing one or more programming commands associated with the first set of data items; and
   identifying the first zone group identifier in the parsed one or more programming commands.

8. The system of claim 1, wherein the operations further comprise:
   receiving, from the host system, a zone reset command to, wherein the zone reset command comprises the first zone group identifier; and
   resetting the memory cells residing at the identified first set of zones that store the first set of data items.

9. A method comprising:
   receiving one or more first requests from a host system to program first host data to one or more memory devices of a memory sub-system,
   wherein the first request comprises a first zone group identifier for a first zone group defined by the host system and a first signal defining a size of the first zone group, wherein at least a portion of the first host data comprises parity data;
   allocating a first set of zones of a plurality of zones residing across the one or more memory devices to the first zone group based on the one or more first requests received from the host system;
   programming the first host data to the first set of zones wherein a combined size of the first set of zones matches at least a size of first zone group indicated by the first signal of the first request and satisfies a programming parallelism criterion;
   receiving one or more second requests from the host system to program second host data to the one or more memory devices, wherein the second request comprises a second zone group identifier for a second zone group for a second zone group defined by the host system and a second signal defining a size of the second zone group;
   allocating a second set of zones of a plurality of zones residing across the one or more memory devices to the second zone group based on the one or more second requests received from the host system;
   programming the second host data to the second set of zones, wherein a combined size of the second set of zones matches at least a size of the second zone group indicated by the second signal of the second request and satisfies the programming parallelism criterion,
   wherein the combined size of the second set of zones is different from the combined size of the first set of zones.

10. The method of claim 9, further comprising:
    determining, in view of the combined size of the first set of zones, whether the first host data can be programmed to the first set of zones in parallel;
    responsive to determining that the first host data can be programmed to the first set of zones in parallel, determining that the first set of zones satisfy the programming parallelism criterion;
    determining, in view of the combined size of the second set of zones, whether the second host data can be programmed to the second set of zones in parallel; and
    responsive to determining that the second host data can be programmed to the second set of zones in parallel, determining that the second set of zones satisfy the programming parallelism criterion.

11. The method of claim 9, further comprising:
    transmitting, to the host system, an indication of a zone size associated with each zone across the one or more memory devices, wherein the combined size of the first set of zones corresponds to a multiple of the indicated zone size.

12. The method of claim 9, further comprising:
    receiving an additional request from the host system to allocate zones across the one or more memory devices to host data associated with the first zone group, wherein the additional request comprises an indication of the first zone group identifier and an indication of a size of the first zone group,
    wherein the first set of zones is identified responsive to the additional request.

13. The method of claim 9, further comprising:
    determining that the first host data is associated with the first zone group based on the first zone group identifier included in each of the one or more first requests received from the host system.

14. The method of claim 13, wherein determining that the first host data is associated with the first zone group based on the first zone group identifier comprises:
    parsing each of the one or more first requests; and
    identifying the first zone group identifier in each of the parsed one or more first requests.

15. A non-transitory computer-readable storage medium comprising instructions that, when executed by a processing device, cause the processing device to perform operations comprising:
    receiving, from a host system, a first request to program a first set of data items to one or more memory devices of a memory sub-system, wherein the first request comprises a first zone group identifier for a first zone group and a first signal defining a size of the first zone group, wherein at least one of the first set of data items comprises parity data;
    determining, in view of the first zone group identifier of the first request, that each data item of the first set of data items is allocated for storage at one or more zones associated with the first zone group;
    identifying of a plurality of zones residing across the one or more memory devices, a first set of zones of a plurality of zones having a combined size of the first set of zones that matches at least a size of the first zone group indicated by the first signal of the first request and satisfying a programming parallelism criterion; and
    allocating the identified first set of zones to the first zone group based on the first request received from the host system; and
    programming each of the first set of data items to memory cells residing at the identified first set of zones.

16. The non-transitory computer-readable storage medium of claim 15, wherein the operations further comprise:
    receiving, from the host system, a second request to program a second set of data items from the host system to the one or more memory devices, wherein the second request comprises a second zone group identifier for a second zone group defined by the host system, and a second signal defining the size of the second zone group, and wherein the size of the second zone group is different from the size of the first zone group;
    determining, in view of the second zone group identifier of the second request, that each data item of the second set of data items is to be programmed to one or more zones associated with the second zone group defined by the host system;

identifying a second set of zones of the plurality of zones for inclusion in the second zone group, wherein a combined size of the second set of zones matches at least a size of the second zone group indicated by the second signal of the second request and satisfies the programming parallelism criterion; and programming the second set of data items to memory cells residing at the identified second set of zones.

17. The non-transitory computer-readable storage medium of claim 15, wherein the operations further comprise:

determining, in view of the combined size of the first set of zones, whether the first set of data items can be programmed to the first set of zones in parallel; and responsive to determining that the first set of data items can be programmed to the set of zones in parallel, determining that the first set of zones satisfy the parallelism criterion.

18. The non-transitory computer-readable storage medium of claim 15, wherein the operations further comprise:

transmitting, to the host system, an indication of a zone size associated with each zone across the one or more memory devices, wherein the combined size of the first set of zones corresponds to a multiple of the indicated zone size.

* * * * *